United States Patent
Masputra et al.

(10) Patent No.: US 11,843,683 B2
(45) Date of Patent: Dec. 12, 2023

(54) METHODS AND APPARATUS FOR ACTIVE QUEUE MANAGEMENT IN USER SPACE NETWORKING

(71) Applicant: Apple Inc., Cupertino, CA (US)

(72) Inventors: Cahya Adiansyah Masputra, San Jose, CA (US); Sandeep Nair, San Jose, CA (US); Darrin Jewell, Woodside, CA (US)

(73) Assignee: APPLE INC., Cupertino, CA (US)

( * ) Notice: Subject to any disclaimer, the term of this patent is extended or adjusted under 35 U.S.C. 154(b) by 435 days.

(21) Appl. No.: 16/368,368

(22) Filed: Mar. 28, 2019

(65) Prior Publication Data

US 2019/0306076 A1    Oct. 3, 2019

Related U.S. Application Data

(60) Provisional application No. 62/649,509, filed on Mar. 28, 2018.

(51) Int. Cl.
*H04L 69/16* (2022.01)
*H04L 69/163* (2022.01)
(Continued)

(52) U.S. Cl.
CPC .......... *H04L 69/162* (2013.01); *G06F 3/0604* (2013.01); *G06F 3/0631* (2013.01);
(Continued)

(58) Field of Classification Search
CPC ............... H04L 69/162; G06F 16/2228; G06F 16/2365; G06F 3/0604; G06F 3/0631
See application file for complete search history.

(56) References Cited

U.S. PATENT DOCUMENTS

| 4,805,137 A | 2/1989 | Grant et al. |
| 4,949,299 A | 8/1990 | Pickett |

(Continued)

FOREIGN PATENT DOCUMENTS

| EP | 3013008 A1 | 4/2016 |
| JP | H02306082 A | 12/1990 |

(Continued)

OTHER PUBLICATIONS

Moon-Sang Lee, Joonwon Lee and S. Maeng, "Context-aware address translation for high-performance SMP cluster system," 2008 IEEE International Conference on Cluster Computing, Tsukuba, 2008, pp. 292-297, doi: 10.1109/CLUSTR.2008.4663784. (Year: 2008).
Honda et al., "Rekindling Network Protocol Innovation with User-Level Stacks", ACM SIGCOMM Computer Communication Review, vol. 44, No. 2, Apr. 2014.

(Continued)

*Primary Examiner* — William G Trost, IV
*Assistant Examiner* — Monishwar Mohan
(74) *Attorney, Agent, or Firm* — Sterne, Kessler, Goldstein & Fox P.L.L.C.

(57) ABSTRACT

Methods and apparatus for active queue management in user space networking stacks. Unlike prior art monolithic networking stacks, the exemplary networking stack architecture described hereinafter includes various components that span multiple domains (both in-kernel, and non-kernel). For example, unlike traditional "socket" based communication, disclosed embodiments can transfer data directly between the kernel and user space domains. Additionally, user space networking stacks require a new flow control methodology that is responsive to networking congestion and/or packet loss. For example, embodiments of the present disclosure introduce a flow advisory table that may, for example, utilize an eventing methodology for active queue management in (Continued)

addition to, or alternatively then, legacy active queue management. Exemplary systems can support multiple networking protocol stack instances (including an in-kernel traditional network stack) as well as flow advisory tables (and legacy active queue management).

20 Claims, 16 Drawing Sheets

(51) Int. Cl.
*H04L 69/164* (2022.01)
*H04L 12/46* (2006.01)
*G06F 9/54* (2006.01)
*H04L 9/40* (2022.01)
*G06F 9/48* (2006.01)
*G06F 9/50* (2006.01)
*G06F 12/10* (2016.01)
*G06F 13/16* (2006.01)
*G06F 3/06* (2006.01)
*G06F 9/46* (2006.01)
*G06F 12/02* (2006.01)
*H04L 47/2475* (2022.01)
*H04L 47/2483* (2022.01)
*H04L 47/6295* (2022.01)
*H04L 49/00* (2022.01)
*H04L 49/9047* (2022.01)
*H04L 69/00* (2022.01)
*G06F 9/455* (2018.01)
*H04L 47/193* (2022.01)
*H04L 47/283* (2022.01)
*G06F 9/52* (2006.01)
*H04L 43/0864* (2022.01)
*G06F 16/23* (2019.01)
*G06F 21/52* (2013.01)
*H04L 47/24* (2022.01)
*H04L 47/30* (2022.01)
*H04L 47/32* (2022.01)
*H04L 47/6275* (2022.01)
*G06F 21/56* (2013.01)
*H04L 69/22* (2022.01)
*G06F 16/22* (2019.01)
*H04L 61/103* (2022.01)
*H04L 61/2503* (2022.01)
*H04L 67/146* (2022.01)
*H04L 69/18* (2022.01)
*H04L 1/00* (2006.01)

(52) U.S. Cl.
CPC .......... *G06F 3/0644* (2013.01); *G06F 3/0673* (2013.01); *G06F 9/45558* (2013.01); *G06F 9/461* (2013.01); *G06F 9/4881* (2013.01); *G06F 9/5005* (2013.01); *G06F 9/5016* (2013.01); *G06F 9/5022* (2013.01); *G06F 9/52* (2013.01); *G06F 9/542* (2013.01); *G06F 9/545* (2013.01); *G06F 12/023* (2013.01); *G06F 12/10* (2013.01); *G06F 13/1668* (2013.01); *G06F 16/2228* (2019.01); *G06F 16/2365* (2019.01); *G06F 21/52* (2013.01); *G06F 21/568* (2013.01); *H04L 12/4641* (2013.01); *H04L 43/0864* (2013.01); *H04L 47/193* (2013.01); *H04L 47/2458* (2013.01); *H04L 47/2475* (2013.01); *H04L 47/2483* (2013.01); *H04L 47/283* (2013.01); *H04L 47/30* (2013.01); *H04L 47/32* (2013.01); *H04L 47/6275* (2013.01); *H04L 47/6295* (2013.01); *H04L 49/30* (2013.01); *H04L 49/9052* (2013.01); *H04L 61/103* (2013.01); *H04L 61/2542* (2013.01); *H04L 63/166* (2013.01); *H04L 67/146* (2013.01); *H04L 69/02* (2013.01); *H04L 69/161* (2013.01); *H04L 69/163* (2013.01); *H04L 69/164* (2013.01); *H04L 69/18* (2013.01); *H04L 69/22* (2013.01); *G06F 9/50* (2013.01); *G06F 2009/45595* (2013.01); *G06F 2209/5011* (2013.01); *G06F 2212/657* (2013.01); *G06F 2221/032* (2013.01); *G06F 2221/034* (2013.01); *H04L 1/0061* (2013.01)

(56) References Cited

U.S. PATENT DOCUMENTS

| 5,367,688 | A  | 11/1994 | Croll |
| 5,467,459 | A  | 11/1995 | Alexander et al. |
| 5,485,578 | A  | 1/1996  | Sweazey |
| 5,506,968 | A  | 4/1996  | Dukes |
| 5,613,086 | A  | 3/1997  | Frey et al. |
| 5,659,542 | A  | 8/1997  | Bell et al. |
| 5,708,779 | A  | 1/1998  | Graziano et al. |
| 5,731,973 | A  | 3/1998  | Takaishi et al. |
| 5,850,395 | A  | 12/1998 | Hauser et al. |
| 5,903,564 | A  | 5/1999  | Ganmukhi et al. |
| 5,943,507 | A  | 8/1999  | Cornish et al. |
| 6,008,992 | A  | 12/1999 | Kawakami |
| 6,032,179 | A  | 2/2000  | Osborne |
| 6,216,178 | B1 | 4/2001  | Stracovsky et al. |
| 6,233,702 | B1 | 5/2001  | Horst et al. |
| 6,260,152 | B1 | 7/2001  | Cole et al. |
| 6,349,355 | B1 | 2/2002  | Draves et al. |
| 6,359,863 | B1 | 3/2002  | Varma et al. |
| 6,411,997 | B1 | 6/2002  | Dawes et al. |
| 6,485,081 | B1 | 11/2002 | Bingle et al. |
| 6,523,073 | B1 | 2/2003  | Kammer et al. |
| 6,553,446 | B1 | 4/2003  | Miller |
| 6,693,895 | B1 | 2/2004  | Crummey et al. |
| 6,815,873 | B2 | 11/2004 | Johnson et al. |
| 6,874,075 | B2 | 3/2005  | Jerding et al. |
| 6,948,094 | B2 | 9/2005  | Schultz et al. |
| 6,973,701 | B2 | 12/2005 | Momoda et al. |
| 6,990,594 | B2 | 1/2006  | Kim |
| 7,013,536 | B2 | 3/2006  | Golden et al. |
| 7,032,282 | B2 | 4/2006  | Powell et al. |
| 7,100,020 | B1 | 8/2006  | Brightman et al. |
| 7,111,307 | B1 | 9/2006  | Wang |
| 7,127,600 | B2 | 10/2006 | Zimmer et al. |
| 7,152,231 | B1 | 12/2006 | Galluscio et al. |
| 7,281,172 | B2 | 10/2007 | Chujo |
| 7,397,774 | B1 | 7/2008  | Holland et al. |
| 7,398,382 | B2 | 7/2008  | Rothman et al. |
| 7,403,542 | B1 | 7/2008  | Thompson |
| 7,506,084 | B2 | 3/2009  | Moerti et al. |
| 7,509,391 | B1 | 3/2009  | Chauvel et al. |
| 7,587,575 | B2 | 9/2009  | Moertl et al. |
| 7,590,817 | B2 | 9/2009  | Moertl et al. |
| 7,617,377 | B2 | 11/2009 | Moertl et al. |
| 7,681,012 | B2 | 3/2010  | Verma et al. |
| 7,685,476 | B2 | 3/2010  | Andre et al. |
| 7,802,256 | B2 | 9/2010  | Havens |
| 7,853,731 | B1 | 12/2010 | Zeng |
| 7,899,941 | B2 | 3/2011  | Hendry et al. |
| 7,941,682 | B2 | 5/2011  | Adams |
| 8,214,707 | B2 | 7/2012  | Munson et al. |
| 8,230,248 | B2 | 7/2012  | Dance et al. |
| 8,239,947 | B1 | 8/2012  | Glick et al. |
| 8,255,725 | B2 | 8/2012  | Shimazaki et al. |
| 8,271,996 | B1 | 9/2012  | Gould et al. |
| 8,352,624 | B2 | 1/2013  | Zimmerman et al. |
| 8,468,285 | B2 | 6/2013  | Kobayashi |
| 8,555,099 | B2 | 10/2013 | Marinkovic et al. |
| 8,561,090 | B2 | 10/2013 | Schneider |
| 8,635,412 | B1 | 1/2014  | Wilshire |

(56) References Cited

U.S. PATENT DOCUMENTS

| | | |
|---|---|---|
| 8,656,228 B2 | 2/2014 | Check et al. |
| 8,769,168 B2 | 7/2014 | Moertl et al. |
| 8,788,822 B1 | 7/2014 | Riddle |
| 8,799,537 B1 | 8/2014 | Zhu et al. |
| 8,806,640 B2 | 8/2014 | Wang |
| 8,819,386 B1 | 8/2014 | Mather |
| 8,848,809 B2 | 9/2014 | Whitby-Strevens |
| 8,855,120 B2 | 10/2014 | Robbins |
| 8,876,062 B1 | 11/2014 | Baghdasarian |
| 9,049,179 B2 | 6/2015 | Luna |
| 9,130,864 B2 | 9/2015 | Keith |
| 9,135,059 B2 | 9/2015 | Ballard et al. |
| 9,152,580 B1 | 10/2015 | Chau et al. |
| 9,170,957 B2 | 10/2015 | Touzni et al. |
| 9,280,360 B2 | 3/2016 | Xu et al. |
| 9,319,090 B2 | 4/2016 | Whitby-Strevens |
| 9,483,305 B1 | 11/2016 | Shmidt et al. |
| 9,544,069 B2 | 1/2017 | Whitby-Strevens et al. |
| 9,547,535 B1 | 1/2017 | Wilt |
| 9,594,718 B2 | 3/2017 | Kaushik et al. |
| 9,769,756 B1 | 9/2017 | Cui et al. |
| 9,830,289 B2 | 11/2017 | Pulyala et al. |
| 9,910,475 B2 | 3/2018 | Kurts et al. |
| 9,913,305 B2 | 3/2018 | Pinheiro et al. |
| 9,932,757 B2 | 4/2018 | Hager |
| 9,959,124 B1 | 5/2018 | Herbeck et al. |
| 9,985,904 B2 * | 5/2018 | Shalev ............... H04L 45/74 |
| 10,078,361 B2 | 9/2018 | Sanghi et al. |
| 10,230,608 B2 * | 3/2019 | Tsirkin ............... G06F 9/545 |
| 10,289,555 B1 | 5/2019 | Michaud et al. |
| 10,331,600 B1 | 6/2019 | Rajadnya et al. |
| 10,331,612 B1 | 6/2019 | Petkov et al. |
| 10,534,601 B1 * | 1/2020 | Venkata ............... H04L 45/74 |
| 10,552,072 B1 | 2/2020 | Bono et al. |
| 10,678,432 B1 | 6/2020 | Dreier et al. |
| 10,798,059 B1 | 10/2020 | Singh et al. |
| 10,798,224 B2 | 10/2020 | Masputra et al. |
| 10,819,831 B2 | 10/2020 | Masputra et al. |
| 10,999,132 B1 | 5/2021 | Sagar et al. |
| 11,095,758 B2 | 8/2021 | Masputra et al. |
| 11,146,665 B2 | 10/2021 | Masputra et al. |
| 11,159,651 B2 | 10/2021 | Masputra et al. |
| 11,178,259 B2 | 11/2021 | Masputra et al. |
| 11,178,260 B2 | 11/2021 | Masputra et al. |
| 11,212,373 B2 | 12/2021 | Masputra et al. |
| 11,368,560 B2 | 6/2022 | Masputra et al. |
| 11,477,123 B2 | 10/2022 | Masputra et al. |
| 11,558,348 B2 | 1/2023 | Masputra et al. |
| 2001/0037410 A1 | 11/2001 | Gardner |
| 2002/0013868 A1 | 1/2002 | West |
| 2002/0044553 A1 | 4/2002 | Chakravorty |
| 2002/0053011 A1 | 5/2002 | Aiken et al. |
| 2002/0065867 A1 | 5/2002 | Chauvel |
| 2002/0169938 A1 | 11/2002 | Scott et al. |
| 2002/0195177 A1 | 12/2002 | Hinkley et al. |
| 2003/0014607 A1 | 1/2003 | Slavin et al. |
| 2003/0061395 A1 | 3/2003 | Kingsbury et al. |
| 2003/0120935 A1 | 6/2003 | Teal et al. |
| 2003/0200413 A1 | 10/2003 | Gurumoorthy et al. |
| 2004/0010473 A1 | 1/2004 | Hsu et al. |
| 2004/0010545 A1 | 1/2004 | Panday |
| 2004/0044929 A1 | 3/2004 | Chujo |
| 2004/0105384 A1 | 6/2004 | Gallezot et al. |
| 2004/0128568 A1 | 7/2004 | O'Shea |
| 2004/0179546 A1 | 9/2004 | McDaniel et al. |
| 2004/0201749 A1 | 10/2004 | Malloy Desormeaux |
| 2004/0221056 A1 | 11/2004 | Kobayashi |
| 2004/0228365 A1 | 11/2004 | Kobayashi |
| 2004/0249957 A1 | 12/2004 | Ekis et al. |
| 2005/0055406 A1 | 3/2005 | Singhai et al. |
| 2005/0068897 A1 | 3/2005 | Arita et al. |
| 2005/0076196 A1 | 4/2005 | Zimmer et al. |
| 2005/0076244 A1 | 4/2005 | Watanabe |
| 2005/0108385 A1 | 5/2005 | Wechter et al. |
| 2005/0114620 A1 | 5/2005 | Justen |
| 2005/0117601 A1 | 6/2005 | Anderson et al. |
| 2005/0138628 A1 | 6/2005 | Bradford et al. |
| 2005/0140683 A1 | 6/2005 | Collins et al. |
| 2005/0149711 A1 | 7/2005 | Zimmer et al. |
| 2005/0157781 A1 | 7/2005 | Ho et al. |
| 2005/0198777 A1 | 9/2005 | Mabe |
| 2005/0278498 A1 | 12/2005 | Ahluwalia et al. |
| 2005/0285862 A1 | 12/2005 | Noda et al. |
| 2006/0039285 A1 | 2/2006 | Chapman et al. |
| 2006/0047989 A1 | 3/2006 | Delgado et al. |
| 2006/0075119 A1 | 4/2006 | Hussain |
| 2006/0107071 A1 | 5/2006 | Girish et al. |
| 2006/0136570 A1 | 6/2006 | Pandya |
| 2006/0186700 A1 | 8/2006 | Browne et al. |
| 2006/0186706 A1 | 8/2006 | Browne et al. |
| 2006/0215697 A1 | 9/2006 | Olderdissen |
| 2006/0218301 A1 | 9/2006 | O'Toole et al. |
| 2006/0232051 A1 | 10/2006 | Morris et al. |
| 2006/0248542 A1 | 11/2006 | Wang et al. |
| 2007/0005869 A1 | 1/2007 | Balraj et al. |
| 2007/0008983 A1 | 1/2007 | Van Doren et al. |
| 2007/0043901 A1 | 2/2007 | Wu et al. |
| 2007/0063540 A1 | 3/2007 | Browne et al. |
| 2007/0063541 A1 | 3/2007 | Browne et al. |
| 2007/0070997 A1 | 3/2007 | Weitz et al. |
| 2007/0080013 A1 | 4/2007 | Melz et al. |
| 2007/0086480 A1 | 4/2007 | Elzur |
| 2007/0118831 A1 | 5/2007 | Kondo |
| 2007/0180041 A1 | 8/2007 | Suzuoki |
| 2007/0183418 A1 | 8/2007 | Riddoch et al. |
| 2007/0201492 A1 | 8/2007 | Kobayashi |
| 2007/0226375 A1 | 9/2007 | Chu et al. |
| 2007/0226417 A1 | 9/2007 | Davis |
| 2007/0255802 A1 | 11/2007 | Aloni |
| 2007/0255866 A1 | 11/2007 | Aloni et al. |
| 2007/0261307 A1 | 11/2007 | Alexander |
| 2007/0286246 A1 | 12/2007 | Kobayashi |
| 2008/0005794 A1 | 1/2008 | Inoue et al. |
| 2008/0007081 A1 | 1/2008 | Shibata et al. |
| 2008/0010563 A1 | 1/2008 | Nishimura |
| 2008/0046689 A1 | 2/2008 | Chen et al. |
| 2008/0077816 A1 | 3/2008 | Ravichandran |
| 2008/0100079 A1 | 5/2008 | Herrera et al. |
| 2008/0100092 A1 | 5/2008 | Gao et al. |
| 2008/0120911 A1 | 5/2008 | Browne et al. |
| 2008/0127292 A1 | 5/2008 | Cooper et al. |
| 2008/0148291 A1 | 6/2008 | Huang et al. |
| 2008/0183931 A1 | 7/2008 | Verm et al. |
| 2008/0231711 A1 | 9/2008 | Glen et al. |
| 2008/0235355 A1 | 9/2008 | Spanier et al. |
| 2008/0244259 A1 | 10/2008 | Zimmer et al. |
| 2008/0301148 A1 | 12/2008 | Lee et al. |
| 2009/0006920 A1 | 1/2009 | Munson et al. |
| 2009/0024924 A1 | 1/2009 | Kim |
| 2009/0092057 A1 | 4/2009 | Doctor et al. |
| 2009/0113141 A1 | 4/2009 | Bullman et al. |
| 2009/0138650 A1 | 5/2009 | Lin et al. |
| 2009/0172674 A1 | 7/2009 | Bobak et al. |
| 2009/0177847 A1 | 7/2009 | Ceze et al. |
| 2009/0189442 A1 | 7/2009 | Chi |
| 2009/0225818 A1 | 9/2009 | Dapper et al. |
| 2009/0240874 A1 | 9/2009 | Pong |
| 2009/0265723 A1 | 10/2009 | Mochizuki et al. |
| 2009/0322531 A1 | 12/2009 | Estevez et al. |
| 2010/0005014 A1 | 1/2010 | Castle et al. |
| 2010/0017655 A1 | 1/2010 | Gooding et al. |
| 2010/0049876 A1 | 2/2010 | Pope et al. |
| 2010/0057932 A1 | 3/2010 | Pope et al. |
| 2010/0082859 A1 | 4/2010 | Hendry et al. |
| 2010/0098419 A1 | 4/2010 | Levy et al. |
| 2010/0118041 A1 | 5/2010 | Chen et al. |
| 2010/0329319 A1 | 12/2010 | Dai et al. |
| 2011/0029696 A1 | 2/2011 | Uehara |
| 2011/0035575 A1 | 2/2011 | Kwon et al. |
| 2011/0052142 A1 | 3/2011 | Sultenfuss et al. |
| 2011/0083002 A1 | 4/2011 | Albers et al. |
| 2011/0161619 A1 | 6/2011 | Kaminski et al. |
| 2011/0219208 A1 | 9/2011 | Asaad et al. |
| 2011/0242425 A1 | 10/2011 | Zeng |

(56) References Cited

U.S. PATENT DOCUMENTS

| | | |
|---|---|---|
| 2011/0246742 A1 | 10/2011 | Kogen et al. |
| 2011/0276710 A1 | 11/2011 | Mighani et al. |
| 2011/0292936 A1 | 12/2011 | Wang et al. |
| 2011/0310296 A1 | 12/2011 | Lee et al. |
| 2011/0320861 A1 | 12/2011 | Bayer et al. |
| 2012/0017063 A1 | 1/2012 | Hummel et al. |
| 2012/0036334 A1 | 2/2012 | Horman et al. |
| 2012/0072658 A1 | 3/2012 | Hashimoto |
| 2012/0084483 A1 | 4/2012 | Sanjive |
| 2012/0084484 A1 | 4/2012 | Post et al. |
| 2012/0102307 A1 | 4/2012 | Wong |
| 2012/0124252 A1 | 5/2012 | Kayama |
| 2012/0203880 A1 | 8/2012 | Kluyt et al. |
| 2012/0224640 A1 | 9/2012 | Sole Rojals et al. |
| 2012/0229076 A1 | 9/2012 | Zhu et al. |
| 2012/0260017 A1 | 10/2012 | Mine et al. |
| 2013/0039278 A1 | 2/2013 | Bouazizi et al. |
| 2013/0050216 A1 | 2/2013 | Whitby-Strevens et al. |
| 2013/0057567 A1 | 3/2013 | Frank et al. |
| 2013/0067188 A1 | 3/2013 | Mehra et al. |
| 2013/0091772 A1 | 4/2013 | Berger et al. |
| 2013/0111014 A1 | 5/2013 | Lawrie et al. |
| 2013/0138840 A1 | 5/2013 | Kegel et al. |
| 2013/0162911 A1 | 6/2013 | Glen |
| 2013/0204927 A1 | 8/2013 | Kruglikov et al. |
| 2013/0205113 A1 | 8/2013 | Ahmad et al. |
| 2013/0275976 A1 | 10/2013 | Dawson et al. |
| 2013/0290947 A1 | 10/2013 | Li |
| 2013/0347131 A1 | 12/2013 | Mooring et al. |
| 2014/0033220 A1 | 1/2014 | Campbell et al. |
| 2014/0068624 A1 | 3/2014 | Fuller et al. |
| 2014/0068636 A1* | 3/2014 | Dupont ............... G06F 9/545 719/318 |
| 2014/0122695 A1* | 5/2014 | Kulikov ............... H04L 43/00 709/224 |
| 2014/0122828 A1 | 5/2014 | Kagan et al. |
| 2014/0173236 A1 | 6/2014 | Kegel |
| 2014/0189057 A1 | 7/2014 | Sankoda et al. |
| 2014/0211894 A1 | 7/2014 | Yang |
| 2014/0247983 A1 | 9/2014 | MacInnis et al. |
| 2014/0355606 A1 | 12/2014 | Riddoch et al. |
| 2015/0007262 A1 | 1/2015 | Aissi et al. |
| 2015/0036051 A1 | 2/2015 | Broberg et al. |
| 2015/0058444 A1 | 2/2015 | Willmann |
| 2015/0081985 A1 | 3/2015 | Archer et al. |
| 2015/0156122 A1* | 6/2015 | Singh ............... H04L 47/193 370/235 |
| 2015/0172345 A1* | 6/2015 | Mantin ............... H04L 65/60 709/219 |
| 2015/0189109 A1 | 7/2015 | Whitby-Strevens et al. |
| 2015/0205749 A1 | 7/2015 | Whitby-Strevens et al. |
| 2015/0212806 A1 | 7/2015 | Hsieh |
| 2015/0244804 A1* | 8/2015 | Warfield ............ H04L 47/6295 709/219 |
| 2015/0261588 A1 | 9/2015 | Liu et al. |
| 2015/0309940 A1 | 10/2015 | Kumar |
| 2015/0326542 A1* | 11/2015 | Serebrin ............... G06F 9/455 713/160 |
| 2015/0363110 A1 | 12/2015 | Batra et al. |
| 2015/0370582 A1 | 12/2015 | Kinsella et al. |
| 2015/0378737 A1 | 12/2015 | Debbage et al. |
| 2016/0028635 A1 | 1/2016 | Wang |
| 2016/0034195 A1 | 2/2016 | Li et al. |
| 2016/0041852 A1 | 2/2016 | Suarez Gracia et al. |
| 2016/0044143 A1* | 2/2016 | Narasimhamurthy .. H04L 69/16 709/213 |
| 2016/0063258 A1 | 3/2016 | Ackerly |
| 2016/0077989 A1 | 3/2016 | Pulyala et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0142988 A1 | 5/2016 | Powell et al. |
| 2016/0208539 A1 | 7/2016 | Hofmann et al. |
| 2016/0224442 A1 | 8/2016 | Sanghi et al. |
| 2016/0226957 A1* | 8/2016 | Zhang ............... H04L 12/4654 |
| 2016/0226967 A1* | 8/2016 | Zhang ............... H04L 67/1002 |
| 2016/0231929 A1 | 8/2016 | Tsirkin |
| 2016/0261632 A1 | 9/2016 | Kölhi et al. |
| 2016/0269991 A1 | 9/2016 | Van Greunen et al. |
| 2016/0357443 A1 | 12/2016 | Li et al. |
| 2016/0363955 A1 | 12/2016 | Stevens et al. |
| 2016/0364350 A1 | 12/2016 | Sanghi et al. |
| 2016/0378545 A1* | 12/2016 | Ho ............... G06F 9/46 718/107 |
| 2017/0003977 A1 | 1/2017 | Sumida et al. |
| 2017/0003997 A1 | 1/2017 | Kelly et al. |
| 2017/0075856 A1 | 3/2017 | Suzue et al. |
| 2017/0089641 A1 | 3/2017 | Humfeld et al. |
| 2017/0108912 A1 | 4/2017 | Li et al. |
| 2017/0111283 A1 | 4/2017 | Kumar et al. |
| 2017/0124327 A1 | 5/2017 | Kumbhar et al. |
| 2017/0126726 A1 | 5/2017 | Han |
| 2017/0147282 A1 | 5/2017 | Seo |
| 2017/0149890 A1 | 5/2017 | Shamis |
| 2017/0187621 A1 | 6/2017 | Shalev et al. |
| 2017/0187846 A1* | 6/2017 | Shalev ............... H04L 69/22 |
| 2017/0249098 A1 | 8/2017 | Petkov et al. |
| 2017/0264497 A1 | 9/2017 | Lim |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2017/0308460 A1 | 10/2017 | Guthula et al. |
| 2017/0337588 A1 | 11/2017 | Chittilappilly et al. |
| 2017/0353499 A1 | 12/2017 | Huang et al. |
| 2017/0371591 A1 | 12/2017 | Xia et al. |
| 2018/0004690 A1 | 1/2018 | Kaminski et al. |
| 2018/0070341 A1 | 3/2018 | Islam et al. |
| 2018/0081829 A1 | 3/2018 | Kaplan |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0173643 A1 | 6/2018 | Yu et al. |
| 2018/0196648 A1 | 7/2018 | Henderson et al. |
| 2018/0219805 A1 | 8/2018 | MacNeil et al. |
| 2018/0219976 A1 | 8/2018 | Decenzo et al. |
| 2018/0239657 A1* | 8/2018 | Petrbok ............... G06F 9/546 |
| 2018/0248847 A1 | 8/2018 | Guri et al. |
| 2018/0253315 A1 | 9/2018 | Norton et al. |
| 2018/0285561 A1 | 10/2018 | Frank et al. |
| 2018/0295052 A1 | 10/2018 | St-Laurent |
| 2018/0329743 A1 | 11/2018 | Pope et al. |
| 2018/0343206 A1 | 11/2018 | White et al. |
| 2018/0357176 A1* | 12/2018 | Wang ............... G06F 9/544 |
| 2019/0007850 A1 | 1/2019 | DenBoer et al. |
| 2019/0036893 A1 | 1/2019 | Jiang |
| 2019/0052659 A1 | 2/2019 | Weingarten et al. |
| 2019/0065301 A1 | 2/2019 | Tsirkin et al. |
| 2019/0097938 A1 | 3/2019 | Talla et al. |
| 2019/0102303 A1* | 4/2019 | Wang ............... G06F 12/084 |
| 2019/0102568 A1* | 4/2019 | Hausauer ............... G06F 21/62 |
| 2019/0109714 A1* | 4/2019 | Clark ............... H04L 63/1441 |
| 2019/0140983 A1 | 5/2019 | Tu et al. |
| 2019/0141041 A1* | 5/2019 | Bhabbur ............... H04L 9/0643 |
| 2019/0147066 A1* | 5/2019 | Ben Dayan ............ G06F 3/0604 711/100 |
| 2019/0147069 A1* | 5/2019 | Ben Dayan ............ G06F 3/06 707/693 |
| 2019/0205533 A1* | 7/2019 | Diehl ............... G06F 21/53 |
| 2019/0213044 A1 | 7/2019 | Cui et al. |
| 2019/0213166 A1 | 7/2019 | Petkov et al. |
| 2019/0253351 A1 | 8/2019 | Ihlar et al. |
| 2019/0286466 A1 | 9/2019 | Tsirkin et al. |
| 2019/0303204 A1 | 10/2019 | Masputra et al. |
| 2019/0303205 A1 | 10/2019 | Masputra et al. |
| 2019/0303221 A1 | 10/2019 | Masputra et al. |
| 2019/0303222 A1 | 10/2019 | Masputra et al. |
| 2019/0303280 A1 | 10/2019 | Masputra et al. |
| 2019/0303562 A1 | 10/2019 | Masputra et al. |
| 2019/0303576 A1 | 10/2019 | Masputra et al. |
| 2019/0306087 A1 | 10/2019 | Masputra et al. |
| 2019/0306109 A1 | 10/2019 | Masputra et al. |
| 2019/0306281 A1 | 10/2019 | Masputra et al. |
| 2019/0306282 A1 | 10/2019 | Masputra et al. |

(56) References Cited

U.S. PATENT DOCUMENTS

| | | | |
|---|---|---|---|
| 2020/0019695 A1 | 1/2020 | Sovio et al. |
| 2020/0036615 A1 | 1/2020 | Lewis |
| 2020/0045015 A1 | 2/2020 | Nukala et al. |
| 2020/0065244 A1 | 2/2020 | Sanghi et al. |
| 2020/0073829 A1 | 3/2020 | Tsirkin et al. |
| 2020/0195684 A1 | 6/2020 | Linz |
| 2021/0011856 A1 | 1/2021 | Xia et al. |
| 2021/0097006 A1 | 4/2021 | Masputra et al. |
| 2021/0099391 A1 | 4/2021 | Masputra et al. |
| 2021/0099427 A1 | 4/2021 | Masputra et al. |
| 2022/0030095 A1 | 1/2022 | Masputra et al. |
| 2022/0046117 A1 | 2/2022 | Masputra et al. |
| 2023/0155980 A1 | 5/2023 | Masputra et al. |

FOREIGN PATENT DOCUMENTS

| | | |
|---|---|---|
| JP | H03169996 A | 7/1991 |
| JP | 2004086792 A | 3/2004 |
| JP | 2012108677 A | 6/2012 |
| JP | 2013246642 A | 12/2013 |
| JP | 2015001867 A | 1/2015 |
| WO | WO 2008070138 A2 | 6/2008 |

OTHER PUBLICATIONS

Gopalakrishnan R., et al., "Efficient User-Space Protocol Implementations with QoS Guarantees Using Real-Time Upcalls", IEEE/ACM Transactions on Networking, Aug. 1998, vol. 6 (4), pp. 374-388.

ECN L1 Pm Substates with CLKREQ approved Aug. 23, 2012.

Jackson, "PCI Express Technology", Sep. 2012 (Sep. 2012), MindShare Press, xP002777351, pp. 49,86,87,712-723.

PCI Express base Specification Revision 3.0, published Nov. 10, 2010.

PCI Express Base Specification Revision 3.1, published Oct. 8, 2014.

Universal Serial Bus, Communication Class, Subclass Specifications for Network Control Model (NCM) Devices; Revision 1.0 (Errata 1), Nov. 24, 2010, published by USB Implementers Forum, Inc.

Whitworth, "Improving Networking by moving the network stack to userspace", Imperial College London, Jun. 14, 2010 [Mar. 17, 2022]; retrieved from the Internet: < URL https://www.doc.ic.ac.uk/teaching/distinguished-projects/2010/m.whitworth.pdf> (Year: 2010).

* cited by examiner

METHODS AND APPARATUS FOR ACTIVE QUEUE MANAGEMENT IN USER SPACE NETWORKING

PRIORITY

This application claims the benefit of priority to U.S. Provisional Patent Application Ser. No. 62/649,509 filed Mar. 28, 2018 and entitled "METHODS AND APPARATUS FOR EFFICIENT DATA TRANSFER WITHIN USER SPACE NETWORKING STACK INFRASTRUCTURES", which is incorporated herein by reference in its entirety.

RELATED APPLICATIONS

This application is related to U.S. patent application Ser. No. 16/144,992 filed Sep. 27, 2018 and entitled "Methods and Apparatus for Single Entity Buffer Pool Management", U.S. patent application Ser. No. 16/146,533 filed Sep. 28, 2018 and entitled "Methods and Apparatus for Regulating Networking Traffic in Bursty System Conditions", U.S. patent application Ser. No. 16/146,324 filed Sep. 28, 2018 and entitled "Methods and Apparatus for Preventing Packet Spoofing with User Space Communication Stacks", U.S. patent application Ser. No. 16/146,916 filed Sep. 28, 2018 and entitled "Methods and Apparatus for Channel Defunct Within User Space Stack Architectures", U.S. patent application Ser. No. 16/236,032 filed Dec. 28, 2018 and entitled "Methods and Apparatus for Classification of Flow Metadata with User Space Communication Stacks", U.S. patent application Ser. No. 16/363,495 filed Mar. 25, 2019 and entitled "Methods and Apparatus for Dynamic Packet Pool Configuration in Networking Stack Infrastructures", U.S. patent application Ser. No. 16/365,462 filed Mar. 26, 2019 and entitled "Methods and Apparatus for Sharing and Arbitration of Host Stack Information with User Space Communication Stacks", U.S. patent application Ser. No. 16/365,484 filed Mar. 26, 2019 and entitled "Methods and Apparatus for Virtualized Hardware Optimizations for User Space Networking", U.S. patent application Ser. No. 16/368,396 filed concurrently herewith on Mar. 28, 2019 and entitled "Methods and Apparatus for Secure Operation of User Space Communication Stacks", U.S. patent application Ser. No. 16/368,338 filed concurrently herewith on Mar. 28, 2019 and entitled "Methods and Apparatus for Memory Allocation and Reallocation in Networking Stack Infrastructures", and U.S. patent application Ser. No. 16/368,214 filed concurrently herewith on Mar. 28, 2019 and entitled "Methods and Apparatus for Self-Tuning Operation within User Space Stack Architectures", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Technical Field

The disclosure relates generally to the field of electronic devices, as well as networks thereof. More particularly, the disclosure is directed to methods and apparatus for implementing computerized networking stack infrastructures. Various aspects of the present disclosure are directed to, in one exemplary aspect, data transfer within user space networking stack infrastructures.

2. Description of Related Technology

The consumer electronics industry has seen explosive growth in network connectivity; for example, Internet connectivity is now virtually ubiquitous across many different device types for a variety of different applications and functionalities. The successful implementation of network connectivity over a myriad of different usage cases has been enabled by, inter alia, the principles of modular design and abstraction. Specifically, the traditional network communication paradigm incorporates multiple (generally) modular software "layers" into a "communication stack." Each layer of the communication stack separately manages its own implementation specific considerations, and provides an "abstracted" communication interface to the next layer. In this manner, different applications can communicate freely across different devices without considering the underlying network transport.

The traditional network communication paradigm has been relatively stable for over 30 years. The Assignee hereof has developed its own implementation of a computer networking stack (based on the traditional networking paradigm) that is mature, robust, and feature-rich (yet conservative). This networking stack is the foundation for virtually all networking capabilities, including those used across the Assignee's products (e.g., MacBook®, iMac®, iPad®, and iPhone®, etc.) and has been designed to handle a variety of protocols (such as TCP (Transmission Control Protocol), UDP (User Datagram Protocol) and IP (Internet Protocol)), and proprietary extensions and functionalities.

While the traditional network communication paradigm has many benefits, changes in the commercial landscape have stretched the capabilities of the existing implementations. Over the past years new use cases have emerged that require capabilities beyond those of the traditional networking stack design. For example, some use cases require control and data movement operations to be performed in so-called "user space" (software that is executed outside the kernel, and specific to a user process). Common examples of such applications include without limitation e.g. Virtual Private Networks (VPN), application proxy, content and traffic filtering, and any number of other network-aware user applications.

Furthermore, certain types of user applications (e.g., media playback, real-time or interactive network applications) would benefit from workload-specific customizations and performance optimizations of the networking stack.

Unfortunately, the current one-size-fits-all networking stack was not designed for (and is thus ill-suited to) the requirements of the aforementioned use cases (and others contemplated herein). More directly, supporting user space applications and associated components from within the traditional in-kernel networking stack architecture adds complexity, increases technical debts (the implied cost of rework attributed to deploying a faster, but suboptimal, implementation), brings in higher processing costs, and results in suboptimal performance and higher power consumption.

To these ends, a networking stack architecture and technology that caters to emerging non-kernel use cases is needed. Ideally, but not as a requisite, such solutions should preserve backwards compatibility with the traditional in-kernel networking stack. More generally, improved methods and apparatus for manipulating and/or controlling lower layer networking communication protocols by higher layer software applications is desired.

SUMMARY

The present disclosure satisfies the foregoing needs by providing, inter alia, methods and apparatus for data transfer within user space networking stack infrastructures.

In one aspect, a method for active queue management in user space networking stacks is disclosed. In one embodiment, the method includes opening a channel for a non-kernel space application, the non-kernel space application including a user space networking stack; writing, by the non-kernel space application, data to the channel; transacting the data written to the channel over a network connection; updating a network condition for the network connection; and modifying operation of the non-kernel space application in response to the updating of the network condition for the network connection.

In one variant, the updating of the network condition for the network connection includes writing to a flow advisory table.

In another variant, the method further includes implementing legacy active queue management for legacy applications that include a kernel space networking stack.

In yet another variant, the updating of the network condition for the network connection further includes using an eventing methodology to notify the non-kernel space application.

In yet another variant, the using of the eventing methodology comprises selectively accessing the flow advisory table by the non-kernel space application.

In yet another variant, the method further includes generating, by the non-kernel space application, a plurality of flows for the opened channel.

In yet another variant, the method further includes prioritizing one of the plurality of flows over another one of the plurality of flows.

In yet another variant, the modifying of the operation of the non-kernel space application includes discarding packets associated with the another one of the plurality of flows, while keeping packets associated with the one of the plurality of flows.

In yet another variant, the method further includes accessing the flow advisory table, by the non-kernel space application, using read-only privileges.

In yet another variant, the opening of the channel for the non-kernel space application includes requesting a channel schema for the non-kernel space application.

In another aspect, a system for active queue management in user space networking stacks is disclosed. In one embodiment, the system includes one or more processors; physical memory in operative communication with the one or more processors; and a network interface controller in operative communication with the physical memory and the one or more processors. The one or more processors are configured to: open a channel for a non-kernel space application, the non-kernel space application comprising a user space networking stack; write, by the non-kernel space application, data to the channel; transact the data written to the channel over a network connection via the network interface controller; update a network condition for the network connection via a write to a data structure associated with the physical memory; and modify operation of the non-kernel space application in response to the updated network condition for the network connection.

In one variant, the network interface controller further includes active queue management for legacy applications, the legacy applications including kernel-based networking stacks.

In another variant, the data structure associated with the physical memory includes a flow advisory table and the update of the network condition includes a write to the flow advisory table by a kernel process.

In yet another variant, the modification to the operation of the non-kernel space application is responsive to an eventing methodology.

In yet another variant, the non-kernel space application selectively accesses the flow advisory table responsive to the updated network condition.

In yet another variant, the one or more processors are configured to generate, by the non-kernel space application, a plurality of flows for the opened channel.

In yet another variant, the one or more processors are configured to prioritize one of the plurality of flows over another one of the plurality of flows.

In yet another variant, the modification of the operation of the non-kernel space application includes a discard of packets associated with the another one of the plurality of flows without a discard of packets associated with the one of the plurality of flows.

In yet another variant, the one or more processors are configured to access the flow advisory table, by the non-kernel space application, with read-only privileges for the access.

In yet another variant, the opening of the channel for the non-kernel space application includes a request for a channel schema for the non-kernel space application.

In yet another aspect, a computerized device implementing one or more of the foregoing aspects is disclosed and described. In one embodiment, the device comprises a personal or laptop computer. In another embodiment, the device comprises a mobile device (e.g., tablet or smartphone).

In another embodiment, the computerized device includes: a kernel space networking stack; a user space networking stack; and a shared memory structure configured for data communication by the user space networking stack and the kernel space networking stack. The kernel space networking stack in this embodiment is configured to: transmit data received from the user space networking stack; provide an update of the network condition; and cause modification of operation of the user space networking stack.

In yet another aspect, a computer readable storage apparatus implementing one or more of the foregoing aspects is disclosed and described. In one embodiment, the computer readable apparatus comprises a program memory, or an EEPROM. In another embodiment, the apparatus includes a solid state drive (SSD) or other mass storage device. In another embodiment, the apparatus comprises a USB or other "flash drive" or other such portable removable storage device. In yet another embodiment, the apparatus comprises a "cloud" (network) based storage device which is remote from yet accessible via a computerized user or client electronic device.

In yet another aspect, a software architecture is disclosed. In one embodiment, the architecture includes both user space and kernel space, separated via a software or virtual partition.

Other features and advantages of the present disclosure will immediately be recognized by persons of ordinary skill in the art with reference to the attached drawings and detailed description of exemplary embodiments as given below.

All figures © Copyright 2017-2019 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While embodiments are primarily discussed in the context of use in conjunction with an inter-processor communication (IPC) link such as that described in, for example, commonly owned U.S. patent application Ser. No. 14/879,024 filed Oct. 8, 2015 and entitled "METHODS AND APPARATUS FOR RUNNING AND BOOTING AN INTER-PROCESSOR COMMUNICATION LINK BETWEEN INDEPENDENTLY OPERABLE PROCESSORS", now U.S. Pat. No. 10,078,361, and co-owned and co-pending U.S. patent application Ser. No. 16/112,480 filed Aug. 24, 2018 and entitled "METHODS AND APPARATUS FOR CONTROL OF A JOINTLY SHARED MEMORY-MAPPED REGION", each of which being incorporated herein by reference in its entirety, it will be recognized by those of ordinary skill that the present disclosure is not so limited.

Existing Network Socket Technologies—

Figure 1:
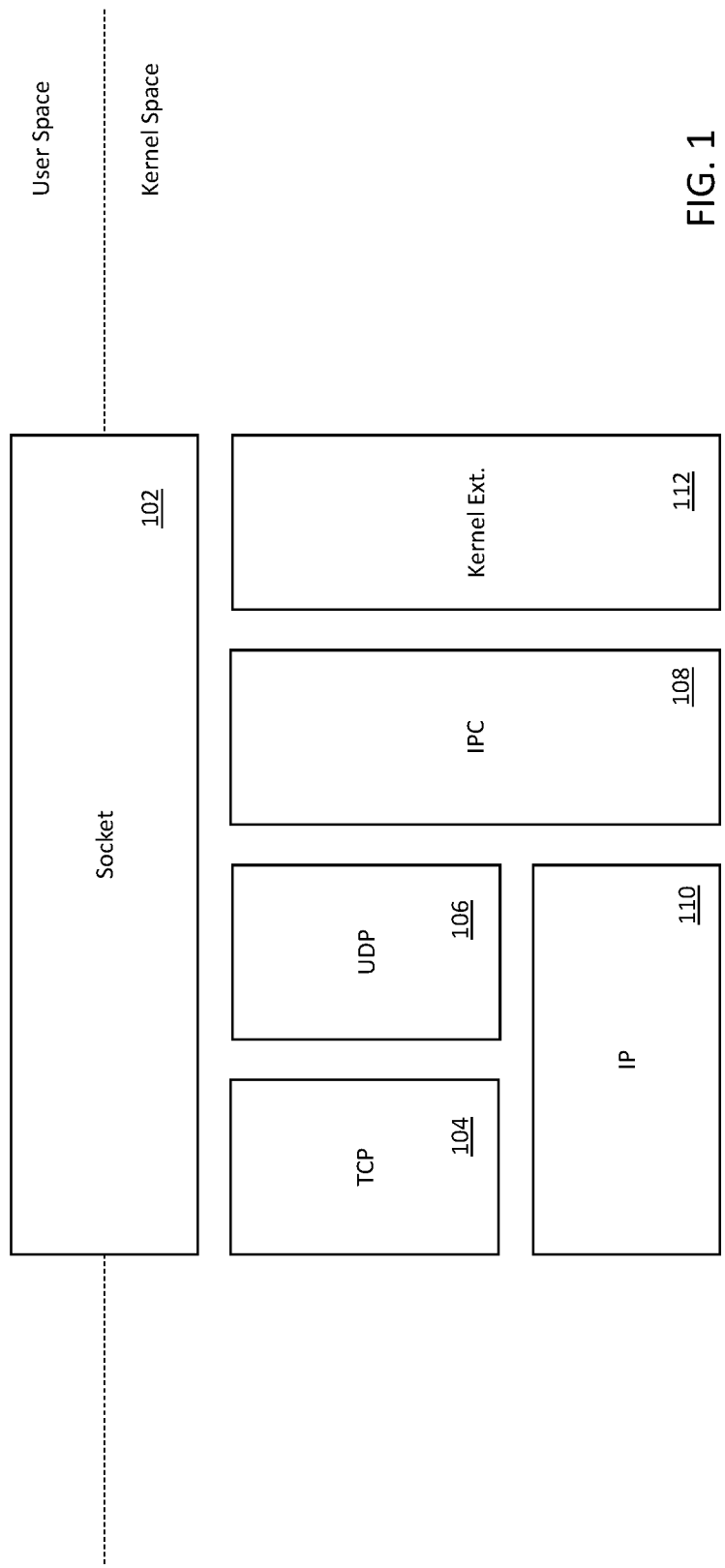
FIG. 1 is a logical representation of a traditional network socket, useful for explaining various aspects of the present disclosure.

FIG. 1 illustrates one logical representation of a traditional network socket 102, useful for explaining various aspects of the traditional networking interface. A network "socket" is a virtualized internal network endpoint for sending or receiving data at a single node in a computer network. A network socket may be created ("opened") or destroyed ("closed") and the manifest of network sockets may be stored as entries in a network resource table which may additionally include reference to various communication protocols (e.g., Transmission Control Protocol (TCP) 104, User Datagram Protocol (UDP) 106, Inter-Processor Communication (IPC) 108, etc.), destination, status, and any other operational processes (kernel extensions 112) and/or parameters); more generally, network sockets are a form of system resource.

As shown in FIG. 1, the socket 102 provides an application programming interface (API) that spans between the user space and the kernel space. An API is a set of clearly defined methods of communication between various software components. An API specification commonly includes, without limitation: routines, data structures, object classes, variables, remote calls and/or any number of other software constructs commonly defined within the computing arts.

As a brief aside, user space is a portion of system memory that a processor executes user processes from. User space is relatively freely and dynamically allocated for application software and a few device drivers. The kernel space is a portion of memory that a processor executes the kernel from. Kernel space is strictly reserved (usually during the processor boot sequence) for running privileged operating system (O/S) processes, extensions, and most device drivers. For example, each user space process normally runs in a specific memory space (its own "sandbox"), and cannot access the memory of other processes unless explicitly allowed. In contrast, the kernel is the core of a computer's operating system; the kernel can exert complete control over all other processes in the system.

The term "operating system" may refer to software that controls and manages access to hardware. An O/S commonly supports processing functions such as e.g., task scheduling, application execution, input and output management, memory management, security, and peripheral access. As used herein, the term "application" refers to software that can interact with the hardware only via procedures and interfaces offered by the O/S.

The term "privilege" may refer to any access restriction or permission which restricts or permits processor execution. System privileges are commonly used within the computing arts to, inter alia, mitigate the potential damage of a computer security vulnerability. For instance, a properly privileged computer system will prevent malicious software applications from affecting data and task execution associated with other applications and the kernel.

As used herein, the term "in-kernel" and/or "kernel space" may refer to data and/or processes that are stored in, and/or have privilege to access to, the kernel space memory allocations. In contrast, the terms "non-kernel" and/or "user space" refers to data and/or processes that are not privileged to access the kernel space memory allocations. In particular, user space represents the address space specific to the user process, whereas non-kernel space represents address space which is not in-kernel, but which may or may not be specific to user processes.

As previously noted, the illustrated socket 102 provides access to Transmission Control Protocol (TCP) 104, User Datagram Protocol (UDP) 106, and Inter-Processor Communication (IPC) 108. TCP, UDP, and IPC are various suites of transmission protocols each offering different capabilities and/or functionalities. For example, UDP is a minimal message-oriented encapsulation protocol that provides no guarantees to the upper layer protocol for message delivery and the UDP layer retains no state of UDP messages once sent. UDP is commonly used for real-time, interactive applications (e.g., video chat, voice over IP (VoIP)) where loss of packets is acceptable. In contrast, TCP provides reliable, ordered, and error-checked delivery of data via a retransmission and acknowledgement scheme; TCP is generally used for file transfers where packet loss is unacceptable, and transmission latency is flexible.

As used herein, the term "encapsulation protocol" may refer to modular communication protocols in which logically separate functions in the network are abstracted from their underlying structures by inclusion or information hiding within higher level objects. For example, in one exemplary embodiment, UDP provides extra information (ports numbering).

As used herein, the term "transport protocol" may refer to communication protocols that transport data between logical endpoints. A transport protocol may include encapsulation protocol functionality.

Both TCP and UDP are commonly layered over an Internet Protocol (IP) 110 for transmission. IP is a connectionless protocol for use on packet-switched networks that provides a "best effort delivery". Best effort delivery does not guarantee delivery, nor does it assure proper sequencing or avoidance of duplicate delivery. Generally these aspects are addressed by TCP or another transport protocol based on UDP.

As a brief aside, consider a web browser that opens a webpage; the web browser application would generally open a number of network sockets to download and/or interact with the various digital assets of the webpage (e.g., for a relatively common place webpage, this could entail instantiating ~300 sockets). The web browser can write (or read) data to the socket; thereafter, the socket object executes system calls within kernel space to copy (or fetch) data to data structures in the kernel space.

As used herein, the term "domain" may refer to a self-contained memory allocation e.g., user space, kernel space. A "domain crossing" may refer to a transaction, event, or process that "crosses" from one domain to another domain. For example, writing to a network socket from the user space to the kernel space constitutes a domain crossing access.

In the context of a Berkeley Software Distribution (BSD) based networking implementation, data that is transacted within the kernel space is stored in memory buffers that are also commonly referred to as "mbufs". Each mbuf is a fixed size memory buffer that is used generically for transfers (mbufs are used regardless of the calling process e.g., TCP, UDP, etc.). Arbitrarily sized data can be split into multiple mbufs and retrieved one at a time or (depending on system support) retrieved using "scatter-gather" direct memory access (DMA) ("scatter-gather" refers to the process of gathering data from, or scattering data into, a given set of buffers). Each mbuf transfer is parameterized by a single identified mbuf.

Notably, each socket transfer can create multiple mbuf transfers, where each mbuf transfer copies (or fetches) data from a single mbuf at a time. As a further complication, because the socket spans both: (i) user space (limited privileges) and (ii) kernel space (privileged without limitation), the socket transfer verifies that each mbuf copy into/out of kernel space is valid. More directly, the verification process ensures that the data access is not malicious, corrupted, and/or malformed (i.e., that the transfer is appropriately sized and is to/from an appropriate area).

The processing overhead associated with domain crossing is a non-trivial processing cost. Processing cost affects user experience both directly and indirectly. A processor has a fixed amount of processing cycles every second; thus cycles that are used for transfer verification detract from more user perceptible tasks (e.g., rendering a video or audio stream). Additionally, processor activity consumes power; thus, increases in processing overhead increases power consumption.

Referring back to FIG. 1, in addition to the generic TCP 104, UDP 106, and IPC 108 communication suites, the illustrated socket 102 also may provide access to various kernel extensions 112. A kernel extension is a dynamically loaded bundle of executable code that executes from kernel space. Kernel extensions may be used to perform low-level tasks that cannot be performed in user space. These low-level tasks typically fall into one or more of: low-level device drivers, network filters, and/or file systems. Examples of sockets and/or extensions include without limitation: route (IP route handling), ndrv (packet 802.1X handling), key (key management), unix (translations for Unix systems), kernel control, kernel events, parental controls, intrusion detection, content filtering, hypervisors, and/or any number of other kernel tasking.

Kernel extensions and public APIs enable, for example, $3^{rd}$ party software developers to develop a wide variety of applications that can interact with a computer system at even the lowest layers of abstraction. For example, kernel extensions can enable socket level filtering, IP level filtering, and even device interface filtering. In the current consumer applications space, many emerging technologies now rely on closely coupled interfaces to the hardware and kernel functionality. For example, many security applications "sniff" network traffic to detect malicious traffic or filter undesirable content; this requires access to other application sandboxes (a level of privilege that is normally reserved for the kernel).

Unfortunately, $3^{rd}$ party kernel extensions can be dangerous and/or undesirable. As previously noted, software applications are restricted for security and stability reasons; however the kernel is largely unrestricted. A $3^{rd}$ party kernel extension can introduce instability issues because the 3rd party kernel extensions run in the same address space as the kernel itself (which is outside the purview of traditional memory read/write protections based on memory allocations). Illegal memory accesses can result in segmentation faults and memory corruptions. Furthermore, unsecure kernel extension can create security vulnerabilities that can be exploited by malware. Additionally, even where correctly used, a kernel extension can expose a user's data to the $3^{rd}$ party software developer. This heightened level of access may raise privacy concerns (e.g., the $3^{rd}$ party developer may have access to browsing habits, etc.).

Existing Performance Optimization Technologies—

Figure 2:
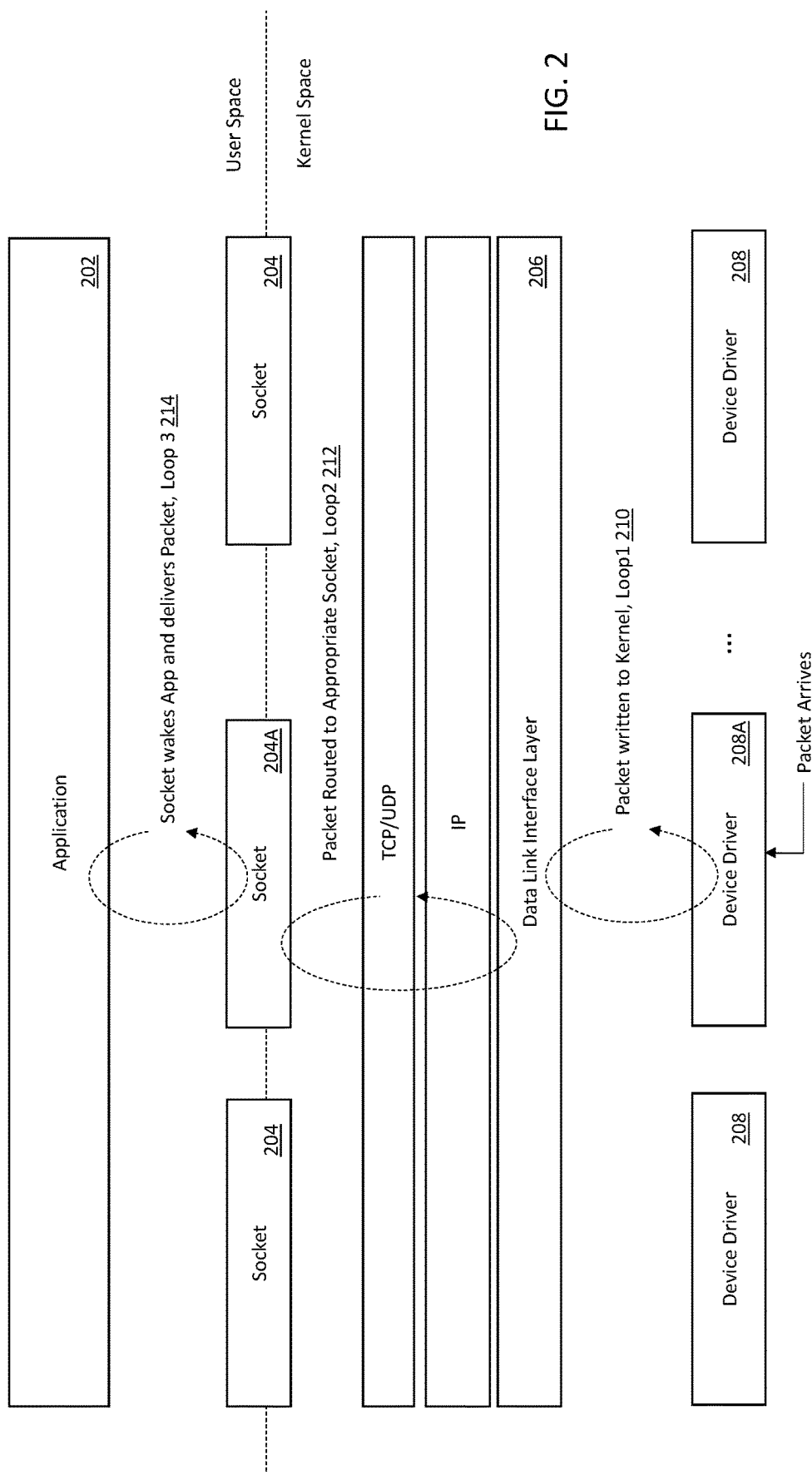
FIG. 2 is a logical representation of a computer system that implements Input/Output (I/O) network control, useful for explaining various aspects of the present disclosure.

FIG. 2 illustrates one logical representation of a computer system that implements Input/Output (I/O) network control, useful for explaining various aspects of traditional network optimization. As depicted therein, a software application 202 executing from user space opens multiple sockets 204 to communicate with e.g., a web server. Each of the sockets interfaces with a Data Link Interface Layer (DLIL) 206.

The DLIL 206 provides a common interface layer to each of the various physical device drivers which will handle the subsequent data transfer (e.g., Ethernet, Wi-Fi, cellular, etc.). The DLIL performs a number of system-wide holistic network traffic management functions. In one such implementation, the DLIL is responsible for BSD Virtual Interfaces, IOKit Interfaces (e.g., DLIL is the entity by which IOKit based network drivers are connected to the networking stack), Active Queue Management (AQM), flow control and advisory action, etc. In most cases, the device driver 208 may be handled by an external device (e.g., a baseband co-processor), thus the DLIL 206 is usually (but not always) the lowest layer of the network communication stack.

During normal operation, the computer system will logically segment its tasks to optimize overall system operation. In particular, a processor will execute a task, and then "context switch" to another task, thereby ensuring that any single process thread does not monopolize processor resources from start to finish. More directly, a context switch is the process of storing the state of a process, or of a thread, so that it can be restored and execution resumed from the same point later. This allows multiple processes to share a single processor. However, excessive amounts of context switching can slow processor performance down. Notably, while the present discussion is primarily discussed within the context of a single processor for ease of understanding, multi-processor systems have analogous concepts (e.g., multiple processors also perform context switching, although contexts may not necessarily be resumed by the same processor).

For example, consider the following example of a packet reception. Packets arrive at the device driver 208A. The hardware managed by the device driver 208A may notify the processor via e.g., a doorbell signal (e.g., an interrupt). The device driver 208A work loop thread handles the hardware interrupt/doorbell, then signals the DLIL thread (Loop 1 210). The processor services the device driver 208A with high priority, thereby ensuring that the device driver 208A operation is not bottlenecked (e.g., that the data does not overflow the device driver's memory and/or that the device driver does not stall). Once the data has been moved out of the device driver, the processor can context switch to other tasks.

At a later point, the processor can pick up the DLIL 206 execution process again. The processor determines which socket the packets should be routed to (e.g., socket 204A) and routes the packet data appropriately (Loop 2 212). During this loop, the DLIL thread takes each packet, and moves each one sequentially into the socket memory space. Again, the processor can context switch to other tasks so as to ensure that the DLIL task does not block other concurrently executed processing.

Subsequently thereafter, when the socket has the complete packet data transfer the processor can wake the user space application and deliver the packet into user space memory (Loop 3 214). Generally, user space applications are treated at lower priority than kernel tasks; this can be reflected by larger time intervals between suspension and resumption. While the foregoing discussion is presented in the context of packet reception, artisans of ordinary skill in the related arts will readily appreciate, given the contents of the present disclosure, that the process is substantially reversed for packet transmission.

As demonstrated in the foregoing example, context switching ensures that tasks of different processing priority are allocated commensurate amounts of processing time. For example, a processor can spend significantly more time executing tasks of relatively high priority, and service lower priority tasks on an as-needed basis. As a brief aside, human perception is much more forgiving than hardware operation. Consequently, kernel tasks are generally performed at a much higher priority than user space applications. The difference in priority between kernel and user space allows the kernel to handle immediate system management (e.g., hardware interrupts, and queue overflow) in a timely manner, with minimal noticeable impact to the user experience.

Moreover, FIG. 2 is substantially representative of every implementation of the traditional network communications stack. While implementations may vary from this illustrative example, virtually all networking stacks share substantially the same delivery mechanism. The traditional network communications stack schema (such as the BSD architecture and derivatives therefrom) have been very popular for the past 30 years due to its relative stability of implementation and versatility across many different device platforms. For example, the Assignee hereof has developed and implemented the same networking stack across virtually all of its products (e.g., MacBook®, iMac®, iPad®, and iPhone®, Apple Watch®, etc.).

Unfortunately, changing tastes in consumer expectations cannot be effectively addressed with the one-size-fits-all model and the conservative in-kernel traditional networking stack. Artisans of ordinary skill in the related arts will readily appreciate, given the contents of the present disclosure, that different device platforms have different capabilities; for example, a desktop processor has significantly more processing and memory capability than a mobile phone processor. More directly, the "one-size-fits-all" solution does not account for the underlying platform capabilities and/or application requirements, and thus is not optimized for performance. Fine-tuning the traditional networking stack for performance based on various "tailored" special cases results in an inordinate amount of software complexity which is untenable to support across the entire ecosystem of devices.

Emerging Use Cases—

Figure 3:
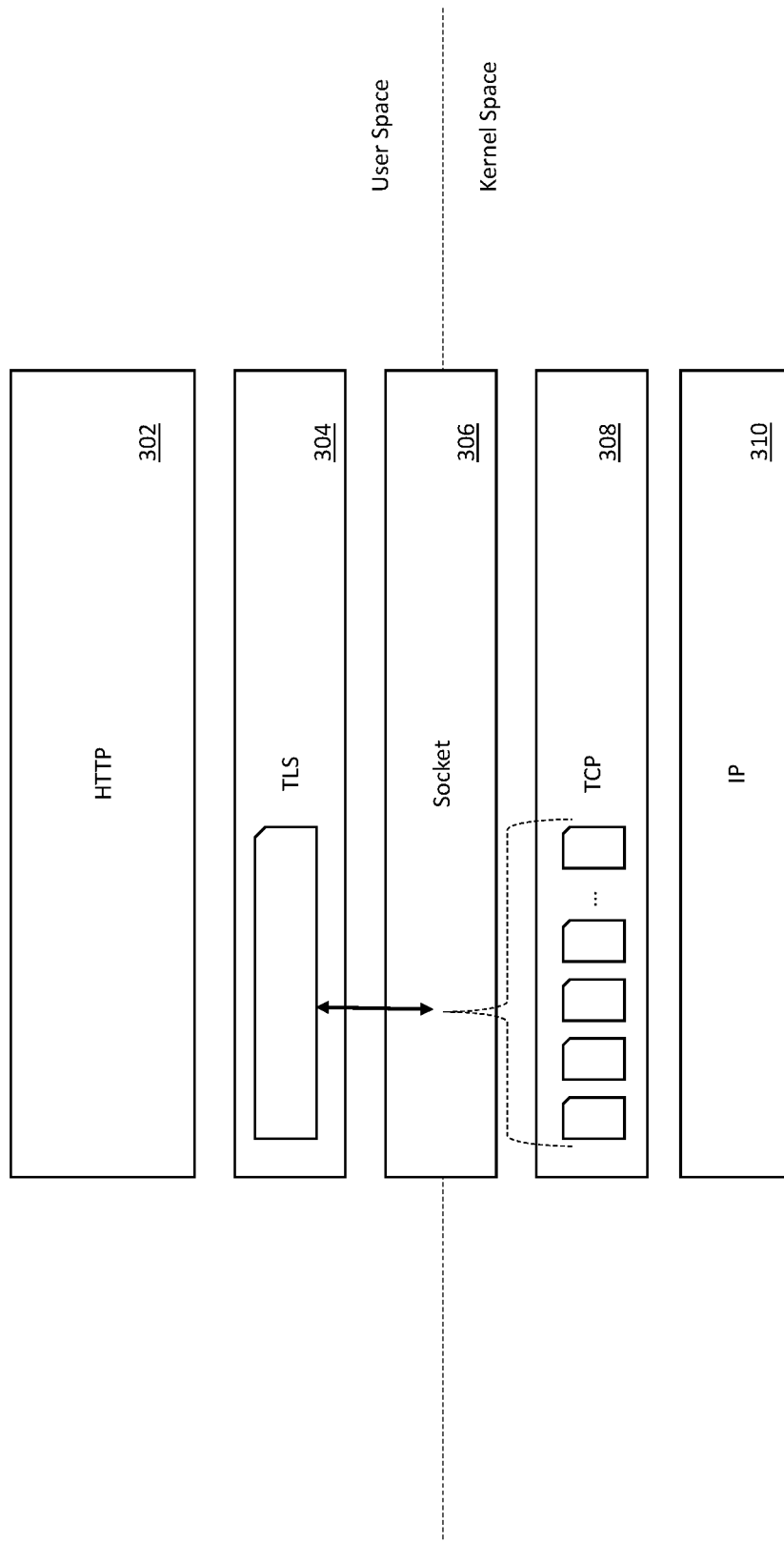
FIG. 3 is a logical block diagram of one exemplary implementation of Transport Layer Security (TLS), useful for explaining various aspects of the present disclosure.

FIG. 3 illustrates a logical block diagram of one exemplary implementation of Transport Layer Security (TLS) (the successor to Secure Sockets Layer (SSL)), useful to explain user/kernel space integration complexities of emerging use cases.

As shown, an application executing from user space can open a Hypertext Transfer Protocol (HTTP) session 302 with a TLS security layer 304 in order to securely transfer data (Application Transport Security (ATS) services) over a network socket 306 that offers TCP/IP transport 308, 310.

As a brief aside, TLS is a record based protocol; in other words, TLS uses data records which are arbitrarily sized (e.g., up to 16 kilobytes). In contrast, TCP is a byte stream protocol (i.e., a byte has a fixed length of eight (8) bits). Consequently, the TCP layer subdivides TLS records into a sequentially ordered set of bytes for delivery. The receiver of the TCP byte stream reconstructs TLS records from the TCP byte stream by receiving each TCP packet, re-ordering the packets according to sequential numbering to recreate the byte stream, and extracting the TLS record from the aggregated byte stream. Notably, every TCP packet of the sequence must be present before the TLS record can be reconstructed. Even though TCP can provide reliable delivery under lossy network conditions, there are a number of situations where TLS record delivery could fail. For example, under ideal conditions TCP isolates packet loss from its client (TLS in this example), and a single TCP packet loss should not result in failed TLS record delivery. However, the TLS layer or the application above may incorporate a timeout strategy in a manner that is unaware of the underlying TCP conditions. Thus, if there's significant packet loss in the network, the TLS timeout may be hit (and thus result in a failure to the application) even though TCP would normally provide reliable delivery.

Referring back to FIG. 3, virtually every modern operating system executes TLS from user space when e.g., securely connecting to other network entities, inter alia, a web browser instance and a server. But existing implementations of TLS are not executed from the kernel (or other privileged software layer) due to e.g., the complexity of error handling within the kernel. However, as a practical matter, TLS would operate significantly better with information regarding the current networking conditions (held in the kernel).

Ideally, the TLS layer should set TLS record sizes based on network condition information. In particular, large TLS records can efficiently use network bandwidth, but require many successful TCP packet deliveries. In contrast, small TLS records incur significantly more network overhead, but can survive poor bandwidth conditions. Unfortunately, networking condition information is lower layer information that is available to the kernel space (e.g., the DLIL and device drivers), but generally restricted from user space applications. Some $3^{rd}$ party application developers and device manufacturers have incorporated kernel extensions (or similar operating system capabilities) to provide network condition information to the TLS user space applications; however, kernel extensions are undesirable due to the aforementioned security and privacy concerns. Alternately, some $3^{rd}$ party applications infer the presence of lossy network conditions based on historic TLS record loss. Such inferences are an indirect measure and significantly less accurate and lag behind real-time information (i.e., previous packet loss often does not predict future packet loss).

Figure 4:
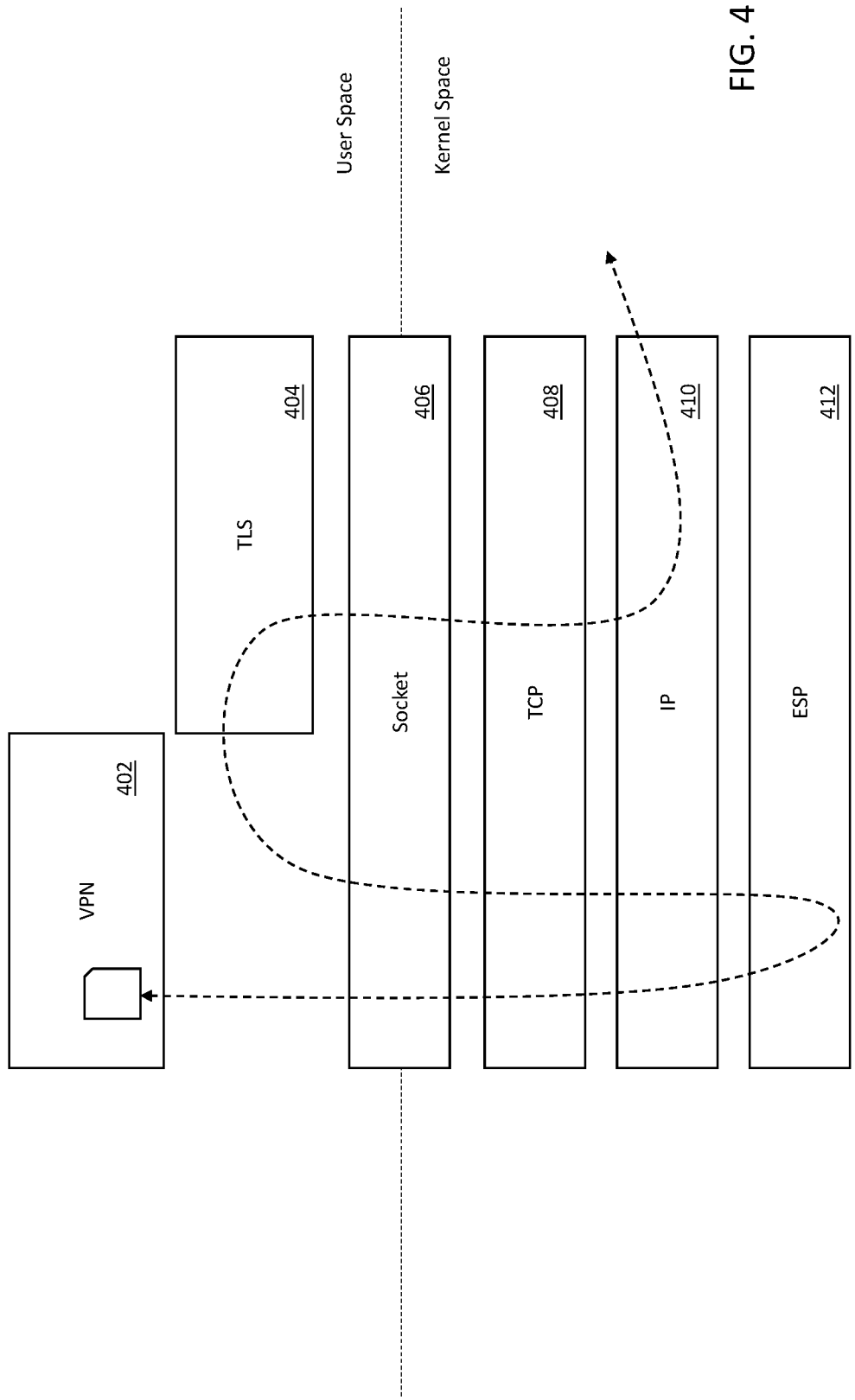
FIG. 4 is a logical block diagram of an exemplary implementation of a Virtual Private Network (VPN), useful for explaining various aspects of the present disclosure.

FIG. 4 illustrates a logical block diagram of an exemplary implementation of a Virtual Private Network (VPN), useful to explain recursive/cross-layer protocol layer complexities of emerging use cases.

As shown, an application executing from user space can open a Virtual Private Network (VPN) session 402 over a network socket 406 that offers TCP/IP transport 408, 410. The VPN session is secured with Encapsulating Security Protocol (ESP) 412. The encrypted packet is securely tunneled via TLS 404 (in user space) and recursively sent again over TCP/IP transport 408, 410.

As illustrated within FIG. 4, the exemplary VPN tunnel starts in user space, crosses into kernel space, returns back to user space, and then crosses back into kernel space before being transferred. Each of the domain crossings results in costly context switches and data shuffling both of which are processor intensive and inefficient. More directly, every time data traverses from user space to kernel space, the data must be validated (which takes non-trivial processing time). Additionally, context switching can introduce significant latency while the task is suspended.

Artisans of ordinary skill in the related arts, given the contents of the present disclosure, will readily appreciate that the exemplary recursive cross layer transaction of FIG. 4 is merely illustrative of a broad range of applications which use increasingly exotic protocol layer compositions. For example, applications that traverse the application proxy/agent data path commonly require tunneling TCP (kernel space) over application proxy/agent data path (user space) over UDP/IP (kernel space). Another common implementation is IP (kernel space) over Quick UDP Internet Connections (QUIC) (user space) over UDP/IP (kernel space).

Figure 5:
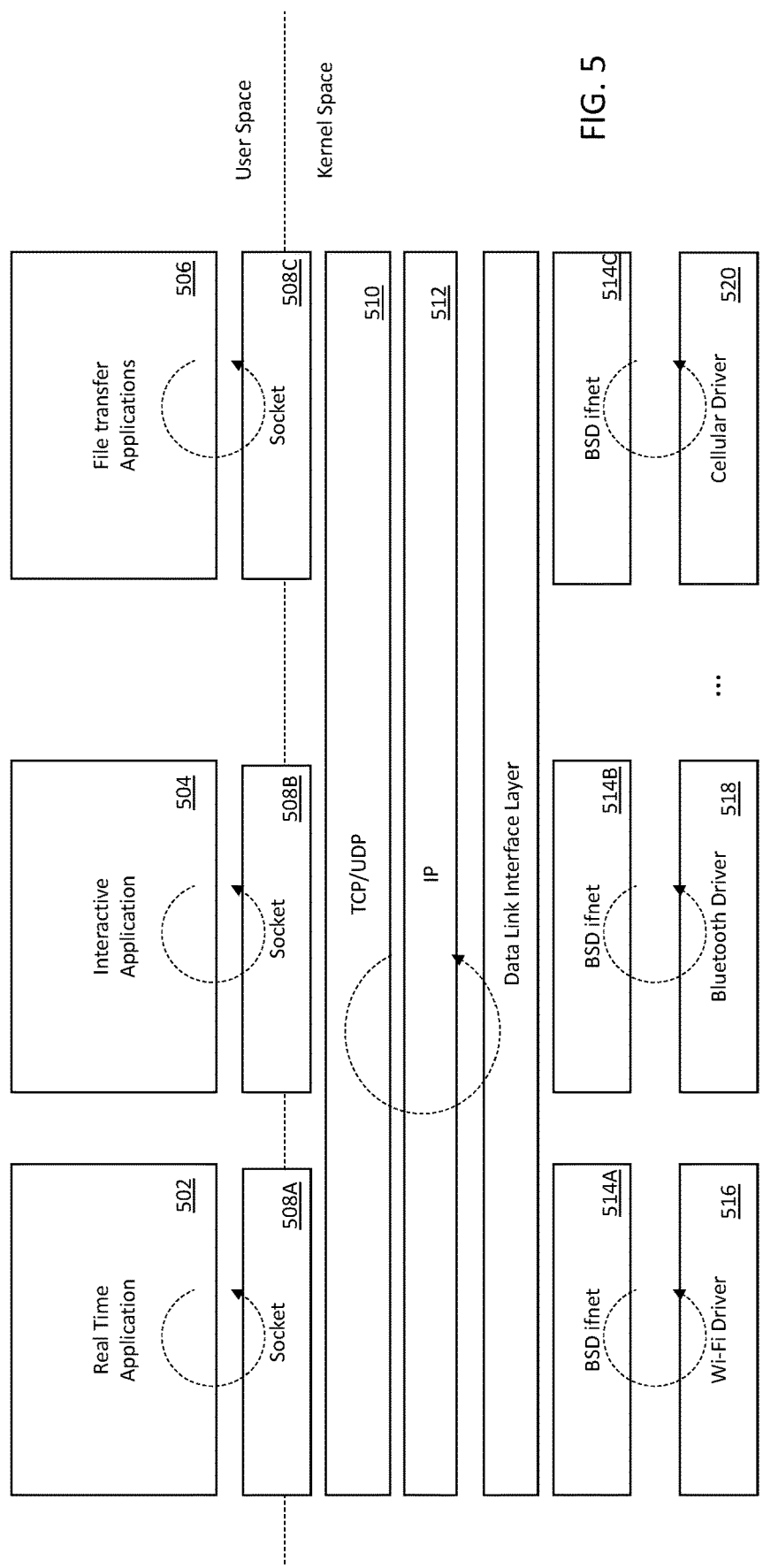
FIG. 5 is a logical block diagram of an exemplary implementation of application based tuning, useful for explaining various aspects of the present disclosure.

FIG. 5 illustrates a logical block diagram of an exemplary implementation of application based tuning, useful to explain various other workload optimization complexities of emerging use cases.

As shown, three (3) different concurrently executed applications (e.g., a real time application 502, interactive application 504, and file transfer applications 506) in user space, each open a session over network sockets 508 (508A, 508B, 508C) that offer TCP/UDP/IP transport 510/512. Depending on the type of physical interface required, the sessions are switched to BSD network interfaces (ifnet) 514 (514A, 514B, 514C) which handle the appropriate technology. Three different illustrated technology drivers are shown: Wi-Fi 516, Bluetooth 518, and cellular 520.

It is well understood within the networking arts that different application types are associated with different capabilities and requirements. One such example is real time applications 502, commonly used for e.g., streaming audio/visual and/or other "live" data. Real time data has significant latency and/or throughput restrictions; moreover, certain real time applications may not require (and/or support) retransmission for reliable delivery of lost or corrupted data. Instead, real time applications may lower bandwidth requirements to compensate for poor transmission quality (resulting in lower quality, but timely, delivered data).

Another such example is interactive applications 504, commonly used for e.g., human input/output. Interactive data should be delivered at latencies that are below the human perceptible threshold (within several milliseconds) to ensure that the human experience is relatively seamless. This latency interval may be long enough for a retransmission, depending on the underlying physical technology. Additionally, human perception can be more or less tolerant of certain types of data corruptions; for example, audio delays below 20 ms are generally imperceptible, whereas audio corruptions (pops and clicks) are noticeable. Consequently, some interactive applications may allow for some level of error correction and/or adopt less aggressive bandwidth management mechanisms depending on the acceptable performance requirements for human perception.

In contrast to real time applications and interactive applications, file transfer applications 506 require perfect data fidelity without latency restrictions. To these ends, most file transfer technologies support retransmission of lost or corrupted data, and retransmission can have relatively long attempt intervals (e.g., on the order of multiple seconds to a minute).

Similarly, within the communication arts, different communication technologies are associated with different capabilities and requirements. For example, Wi-Fi 516 (wireless local area networking based on IEEE 802.11) is heavily based on contention based access and is best suited for high bandwidth deliveries with reasonable latency. Wi-Fi is commonly used for file transfer type applications. Bluetooth 518 (personal area networking) is commonly used for low data rate and low latency applications. Bluetooth is commonly used for human interface devices (e.g., headphones, keyboards, and mouses). Cellular network technologies 520 often provide non-contention based access (e.g., dedicated user access) and can be used over varying geographic ranges. Cellular voice or video delivery is a good example of streaming data applications. Artisans of ordinary skill in the related arts will readily recognize that the foregoing examples are purely illustrative, and that different communication technologies are often used to support a variety of different types of application data. For example, Wi-Fi 516 can support file transfer, real time data transmission and/or interactive data with equivalent success.

Referring back to FIG. 5, the presence of multiple concurrently executing applications of FIG. 5 (real time application 502, interactive application 504, and file transfer applications 506) illustrates the complexities of multi-threaded operation. As shown therein, the exemplary multi-threaded operation incurs a number of server loops. Each server loop represents a logical break in the process during which the processor can context switch (see also aforementioned discussion of Existing Performance Optimization Technologies, and corresponding FIG. 2).

Moreover, in the computing arts, a "locking" synchronization mechanism is used by the kernel to enforce access limits (e.g., mutual exclusion) on resources in multi-threaded execution. During operation, each thread acquires a lock before accessing the corresponding locked resources data. In other words, at any point in time, the processor is necessarily limited to only the resources available to its currently executing process thread.

Unfortunately, each of the applications has different latency, throughput and processing utilization requirements. Since, each of the network interfaces is sending and receiving data at different times, in different amounts, and with different levels of priority. From a purely logistical standpoint, the kernel is constantly juggling between high priority kernel threads (to ensure that the high priority hardware activities do not stall out) while still servicing each of its concurrently running applications to attempt to provide acceptable levels of service. In some cases, however, the kernel is bottlenecked by the processor's capabilities. Under such situations, some threads will be deprioritized; currently, the traditional networking stack architecture is unable it clearly identify which threads can be deprioritized while still providing acceptable user service.

For example, consider an "expected use" device of FIG. 5; the processor is designed for the expected use case of providing streaming video. Designing for expected use cases allows the device manufacturer to use less capable, but adequate components thereby reducing bill of materials (BOM) costs and/or offering features at a reasonable price point for consumers. In this case, a processor is selected that nominally meets the requirements for a streaming video application that is receiving streaming video data via one of the network interfaces (e.g., the Wi-Fi interface), and constantly servicing the kernel threads associated with it. Rendering the video with a real time application 502 from the received data is a user space application that is executed concurrently but at a significantly lower priority. During expected usage, the video rendering is adequate.

Unfortunately, the addition of an unexpected amount of additional secondary interactive applications 504 (e.g., remote control interface, headphones, and/or other interface devices) and/or background file transfer applications can easily overwhelm the processor. Specifically, the primary real time application does not get enough CPU cycles to run within its time budget, because the kernel threads handling networking are selected at a higher priority. In other words, the user space application is not able to depress the priority of kernel networking threads (which are servicing both the primary and secondary processes). This can result in significantly worse user experience when the video rendering stalls out (video frame misses or video frame drops); whereas simply slowing down a file transfer or degrading the interaction interface may have been preferable.

Prior art solutions have tailored software for specific device implementations (e.g., the Apple TV®). For example, the device can be specifically programmed for an expected use. However, tailored solutions are becoming increasingly common and by extension the exceptions have swallowed the more generic use case. Moreover, tailored solutions are undesirable from multiple software maintenance standpoints. Devices have limited productive lifetimes, and software upkeep is non-trivial.

Ideally, a per-application or per-profile workload optimization would enable a single processor (or multiple processors) to intelligently determine when and/or how too intelligently context switch and/or prioritize its application load (e.g., in the example of FIG. 5, to prioritize video decode). Unfortunately, such solutions are not feasible within the context of the existing generic network sockets and generic network interfaces to a monolithic communications stack.

Exemplary Networking Architecture—

A networking stack architecture and technology that caters to the needs of non-kernel based networking use cases is disclosed herein. Unlike prior art monolithic networking stacks, the exemplary networking stack architecture described hereinafter includes various components that span multiple domains (both in-kernel, and non-kernel), with varying transport compositions, workload characteristics and parameters.

In one exemplary embodiment, a networking stack architecture is disclosed that provides an efficient infrastructure to transfer data across domains (user space, non-kernel, and kernel). Unlike the traditional networking paradigm that hide the underlying networking tasks within the kernel and substantially limits control thereof by any non-kernel applications, the various embodiments described herein enable faster and more efficient cross domain data transfers.

Various embodiments of the present disclosure provide a faster and more efficient packet input/output (I/O) infrastructure than prior art techniques. Specifically, unlike traditional networking stacks that use a "socket" based communication, disclosed embodiments can transfer data directly between the kernel and user space domains. Direct transfer reduces the per-byte and per-packet costs relative to socket based communication. Additionally, direct transfer can improve observability and accountability with traffic monitoring.

In one such variant, a simplified data movement model that does not require mbufs (memory buffers) is described in greater detail herein. During one such exemplary operation, the non-kernel processes can efficiently transfer packets directly to and from the in-kernel drivers.

In another embodiment, a networking stack architecture is disclosed that exposes the networking protocol stack infrastructure to user space applications via network extensions. In one such embodiment, the network extensions are software agents that enable extensible, cross-platform-capable, user space control of the networking protocol stack functionality. In another such embodiment, an in-process user space networking stack facilitates tighter integration between the protocol layers (including TLS) and the application or daemon. In some cases, the user space architecture can expose low-level networking interfaces to transport protocols and/or encapsulation protocols such as UDP, TCP, and QUIC; and enable network protocol extensions and rapid development cycles. Moreover, artisans of ordinary skill in the related arts, given the contents of the present disclosure, will readily appreciate that the various principles described herein may be applied to a variety of other operating systems (such as Windows, Linux, Unix, Android), and/or other cross platform implementations.

In some variants, exemplary embodiments of the networking stack can support multiple system-wide networking protocol stack instances (including an in-kernel traditional network stack). Specifically, in one such variant, the exemplary networking stack architecture coexists with the traditional in-kernel networking stack so as to preserve backwards compatibility for legacy networking applications. In such implementations, the in-kernel network stack instance can coexist with the non-kernel network stack via namespace sharing and flow forwarding.

As used herein, an "instance" may refer to a single copy of a software program or other software object; "instancing" and "instantiations" refers to the creation of the instance. Multiple instances of a program can be created; e.g., copied into memory several times. Software object instances are instantiations of a class; for example, a first software agent and second software instance are each distinct instances of the software agent class.

In one such implementation, load balancing for multiple networking stacks is handled within the kernel, thereby ensuring that no single networking stack (including the in-kernel stack) monopolizes system resources.

As a related variant, current/legacy applications can be handled within the in-kernel stack. More directly, by supporting a separate independent in-kernel BSD stack, legacy applications can continue to work without regressions in functionality and performance.

Figure 6:
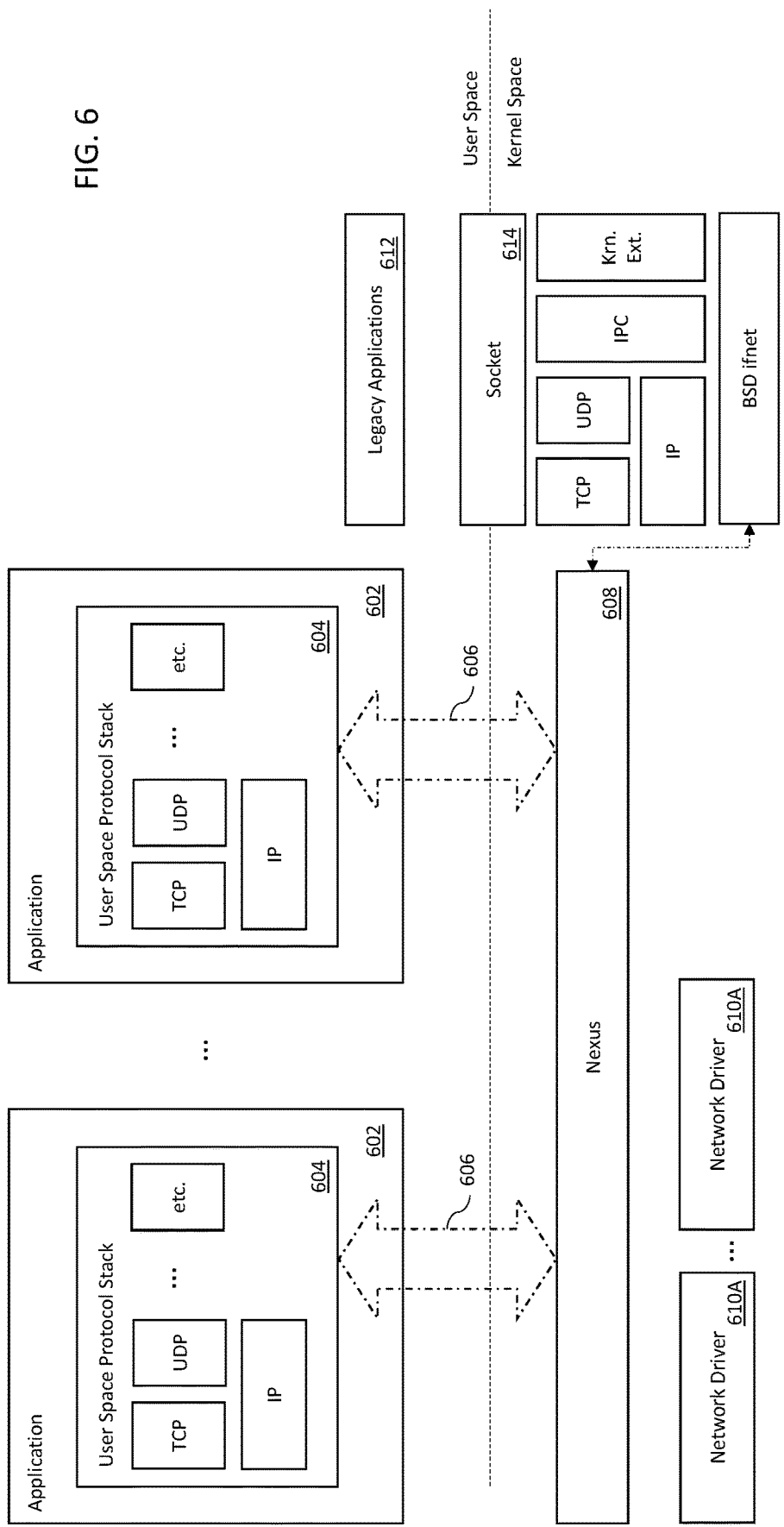
FIG. 6 is a logical representation of an exemplary networking stack architecture, in accordance with the various aspects of the present disclosure.

FIG. 6 illustrates one logical representation of an exemplary networking stack architecture, in accordance with the various aspects of the present disclosure. While the system depicts a plurality of user space applications 602 and/or legacy applications 612, artisans of ordinary skill will readily appreciate given the contents of present disclosure that the disclosed embodiments may be used within single application systems with equivalent success.

As shown, a user space application 602 can initiate a network connection by instancing user space protocol stacks 604. Each user space protocol stacks includes network extensions for e.g., TCP/UDP/QUIC/IP, cryptography, framing, multiplexing, tunneling, and/or any number of other networking stack functionalities. Each user space protocol stack 604 communicates with one or more nexuses 608 via a channel input/output (I/O) 606. Each nexus 608 manages access to the network drivers 610. Additionally shown is legacy application 612 support via existing network socket technologies 614. While the illustrated embodiment shows nexus connections to both user space and in-kernel networking stacks, it is appreciated that the nexus may also enable e.g., non-kernel networking stacks (such as may be used by a daemon or other non-kernel, non-user process).

The following topical sections hereinafter describe the salient features of the various logical constructs in greater detail.

Exemplary I/O Infrastructure—

In one exemplary embodiment, the non-kernel networking stack provides a direct channel input output (I/O) 606. In one such implementation, the channel I/O 606 is included as part of the user space protocol stack 604. More directly, the channel I/O 606 enables the delivery of packets as a raw data I/O into kernel space with a single validation (e.g., only when the user stack provides the data to the one or more nexuses 608). The data can be directly accessed and/or manipulated in situ, the data need not be copied to an intermediary buffer.

In one exemplary implementation, a channel is an I/O scheme leveraging kernel-managed shared memory. During an access, the channel I/O is presented to the process (e.g., the user process or kernel process) as a file descriptor based object, rather than as data. In order to access the data, the process de-references the file descriptor for direct access to the shared memory within kernel space. In one such implementation, the file descriptor based object based I/O is compatible with existing operating system signaling and "eventing" (event notification/response) mechanisms. In one exemplary variant, the channel I/O is based on Inter Process Communication (IPC) packets.

As used herein, the term "descriptor" may refer to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

Within the context of the present disclosure, as used herein, the term "pointer" may refer to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "de-referenced" to recover the data that is stored in the location of memory.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security based information (e.g., cyclic redundancy checks (CRC), parity, etc.).

In one exemplary embodiment, the channel I/O can be further leveraged to provide direct monitoring of its corresponding associated memory. More directly, unlike existing data transfers which are based on mbuf based divide/copy/move, etc., the channel I/O can provide (with appropriate viewing privileges) a direct window into the memory accesses of the system. Such implementations further simplify software development as debugging and/or traffic monitoring can be performed directly on traffic. Direct traffic monitoring can reduce errors attributed to false positives/false negatives caused by e.g., different software versioning, task scheduling, compiler settings, and/or other software introduced inaccuracies.

More generally, unlike prior art solutions which relied on specialized networking stack compositions to provide different degrees of visibility at different layers, the monitoring schemes of the present disclosure provide consistent system-wide channel monitoring infrastructures. Consistent frameworks for visibility, accounting, and debugging greatly improve software maintenance and upkeep costs.

Additionally, simplified schemes for egress filtering can be used to prevent traffic spoofing for user space networking stack instances. For example, various embodiments ensure that traffic of an application cannot be hijacked by another malicious application (by the latter claiming to use the same tuple information, e.g. TCP/UDP port).

In one exemplary embodiment, the in-kernel network device drivers (e.g. Wi-Fi, Cellular, Ethernet) use simplified data movement models based on the aforementioned channel I/O scheme. More directly, the user space networking stacks can directly interface to each of the various different technology based network drivers via channel I/O; in this manner, the user space networking stacks do not incur the traditional data mbuf based divide/copy/move penalties. Additionally, user space applications can directly access user space networking components for immediate traffic handling and processing.

Exemplary Nexus—

In one exemplary embodiment, the networking stack connects to one or more nexus 608. In one such implementation, the nexus 608 is a kernel space process that arbitrates access to system resources including, without limitation e.g., shared memory within kernel space, network drivers, and/or other kernel or user processes. In one such variant, the nexus 608 aggregates one or more channels 606 together for access to the network drivers 610 and/or shared kernel space memory.

In one exemplary implementation, a nexus is a kernel process that determines the format and/or parameters of the data flowing through its connected channels. In some variants, the nexus may further perform ingress and/or egress filtering.

The nexus may use the determined format and/or parameter information to facilitate one-to-one and one-to-many topologies. For example, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

Additionally, in some variants the nexus may provide the format, parameter, and/or ingress egress information to kernel processes and/or one or more appropriately privileged user space processes.

In one exemplary embodiment, the nexus 608 may additionally ensure that there is fairness and/or appropriately prioritize each of its connected stacks. For example, within the context of FIG. 6, the nexus 608 balances the network priorities of both the existing user space protocol stacks 604, as well as providing fair access for legacy socket based access 614. For example, as previously alluded to, existing networking stacks could starve user space applications because the kernel threads handling the legacy networking stack operated at higher priorities than user space applications. However, the exemplary nexus 608 ensures that legacy applications do not monopolize system resources by appropriately servicing the user space network stacks as well as the legacy network stack.

In one such embodiment, in-kernel, non-kernel, and/or user space infrastructures ensure fairness and can reduce latency due to e.g., buffer bloat (across channels in a given nexus, as well as flows within a channel). In other words, the in-kernel and/or user space infrastructures can negotiate proper buffering sizes based on the expected amount of traffic and/or network capabilities for each flow. By buffering data according to traffic and/or network capability, buffers are not undersized or oversized.

As a brief aside, "buffer bloat" is commonly used to describe e.g., high latency caused by excessive buffering of packets. Specifically, buffer bloat may occur when excessively large buffers are used to support a real time streaming application. As a brief aside, TCP retransmission mechanism relies on measuring the occurrence of packet drops to determine the available bandwidth. Under certain congestion conditions, excessively large buffers can prevent the TCP feedback mechanism from correctly inferring the presence of a network congestion event in a timely manner (the buffered packets "hide" the congestion, since they are not dropped). Consequently, the buffers have to drain before TCP congestion control resets and the TCP connection can correct itself.

Referring back to FIG. 6, in one exemplary embodiment, Active Queue Management (AQM) can be implemented in the kernel across one or more (potentially all) of the flow-switch clients (user space and in-kernel networking stack instances). AQM refers to the intelligent culling of network packets associated with a network interface, to reduce network congestion. By dropping packets before the queue is full, the AQM ensures no single buffer approaches its maximum size, and TCP feedback mechanisms remain timely (thereby avoiding the aforementioned buffer bloat issues).

While the foregoing example is based on "fairness" standard, artisans of ordinary skill in the related arts will readily appreciate that other schemes may be substituted with equivalent success given the contents of the present disclosure. For example, some embodiments may dynamically or statically service the user application networking space with greater or less weight compared to the legacy socket based access. For example, user application networking space may be more heavily weighted to improve overall performance or functionality, whereas legacy socket based access may be preferred where legacy applications are preferentially supported (e.g., see Protocol Unloading Offloading, discussed infra).

Exemplary Network Extensions—

In one exemplary embodiment of the present disclosure, a network extension is disclosed. A network extension is an agent-based extension that is tightly coupled to network control policies. The agent is executed by the kernel and exposes libraries of network control functionality to user space applications. During operation, user space software can access kernel space functionality through the context and privileges of the agent.

As used herein, the term "agent" may refer to a software agent that acts for a user space application or other program in a relationship of agency with appropriate privileges. The agency relationship between the agent and the user space application implies the authority to decide which, if any, action is appropriate given the user application and kernel privileges. A software agent is privileged to negotiate with the kernel and other software agents regarding without limitation e.g., scheduling, priority, collaboration, visibility, and/other sharing of user space and kernel space information. While the agent negotiates with the kernel on behalf of the application, the kernel ultimately decides on scheduling, priority, etc.

Various benefits and efficiencies can be gained through the use of network extensions. In particular, user space applications can control the protocol stack down to the resolution of exposed threads (i.e., the threads that are made available by the agent). In other words, software agents expose specific access to lower layer network functionality which was previously hidden or abstracted away from user space applications. For example, consider the previous examples of TLS record sizing (see e.g., FIG. 3, and related discussion); by exposing TCP network conditions to the TLS application within the user space, the TLS application can correctly size records for network congestion and/or wait for underlying TCP retransmissions (rather than timing out).

Similarly, consider the previous examples of multi-threading within the context of expected use devices (see e.g., FIG. 5, and related discussion); the primary user space application (e.g., video coding) and additional secondary interactive applications (e.g., remote control interface, headphones, and/or other interface devices) can internally negotiate their relative priority to the user's experience. The user space applications can appropriately adjust their priorities for the nexus (i.e., which networking threads are serviced first and/or should be deprioritized). Consequently, the user space applications can deprioritize non-essential network accesses, thereby preserving enough CPU cycles for video decode.

As a related benefit, since a software agent represents the application to the kernel; the agent can trust the kernel, but the kernel may or may not trust the agent. For example, a software agent can be used by the kernel to convey network congestion information in a trusted manner to the application; similarly, a software agent can be used by an application to request a higher network priority. Notably, since a software agent operates from user space, the agent's privilege is not promoted to kernel level permissions. In other words, the agent does not permit the user application to exceed its privileges (e.g., the agent cannot commandeer the network driver at the highest network priority, or force a read/write to another application's memory space without the other kernel and/or other application's consent).

Networking extensions allow the user space application to execute networking communications functionality within the user space and interpose a network extension between the user space application and the kernel space. As a result, the number of cross domain accesses for complex layering of different protocol stacks can be greatly reduced. Limiting cross domain accesses prevents context switching and allows the user space to efficiently police its own priorities. For example, consider the previous example of a VPN session as was previously illustrated in FIG. 4. By keeping the TCP/IP, Internet Protocol Security (IPsec) and TLS operations within user space, the entire tunnel can be performed within the user space, and only cross the user/kernel domain once.

As used herein, the term "interposition" may refer to the insertion of an entity between two or more layers. For example, an agent is interposed between the application and the user space networking stack. Depending on the type of agent or network extension, the interposition can be explicit or implicit. Explicit interposition occurs where the application explicitly instances the agent or network extension. For example, the application may explicitly call a user space tunnel extension. In contrast, implicit interposition occurs where the application did not explicitly instance the agent or network extension. Common examples of implicit interposition occur where one user space application sniffs the traffic or filters the content of another user space application.

Namespace Sharing & Flow Forwarding Optimizations—

In one exemplary optimization of the present disclosure, the nexus includes a namespace registration and management component that manages a common namespace for all of its connected networking stack instances. As a brief aside, a namespace generally refers to a set of unique identifiers (e.g., the names of types, functions, variables) within a common context. Namespaces are used to prevent naming "collisions" which occur where multiple processes call the same resource differently and/or call different resources the same.

In one such implementation, the shared networking protocol has a common namespace (e.g., {Address, Protocol, and Port}) across multiple networking stack instances. Sharing a namespace between different networking stacks reduces the amount of kernel burden, as the kernel can natively translate (rather than additionally adding a layer of network address translation).

For example, if a first application acquires port 80, the namespace registration ensures that other applications will not use port 80 (e.g., they can be assigned e.g., port 81, 82, etc.) In some such implementations, legacy clients may use default namespaces that conflict (e.g., a default web client may always select port 80); thus the shared namespace registration may also be required to force a re-assignment of a new identifier (or else translate for) such legacy applications.

In one exemplary embodiment, the namespace registration and management components control flow-switching and forwarding logic of each flow-switch nexus instance. For example, as previously noted, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

For example, during normal operation when an application requests a port, the namespace registration and management will create a flow and assign a particular port to the application. Subsequent packets addressed to the port will be routed appropriately to the flow's corresponding application. In one such variant, packets that do not match any registered port within the shared namespace registration and management will default to the legacy networking stack (e.g., the flow-switch assumes that the unrecognized packet can be parsed and/or ignored by the fallback legacy stack).

Artisans of ordinary skill in the related arts will readily appreciate, given the contents of the present disclosure that disparate and/or otherwise distinct namespace registrations and/or management components may be preferable based on other implementation specific considerations. For example, some implementations may prefer to shield namespaces from other external processes e.g., for security and/or privacy considerations. In other implementations, the benefits associated with native namespace translation may be less important than supporting legacy namespaces.

Protocol Onloading and Offloading—

In the foregoing discussions, the improvements to user space operation may be primarily due to the user space networking stack, as shown in FIG. 6. However, various embodiments of the present disclosure also leverage the existing legacy host networking infrastructure to handle networking transactions which are unrelated to user experience.

Colloquially, the term "hardware offload" may be commonly used to denote tasks which can be handled within dedicated hardware logic to improve overall processing speed or efficiency. One such example is the cyclic redundancy check (CRC) calculation which is an easily parameterized, closed, iterative calculation. The characteristics of CRC calculation lend itself to hardware offload because the CRC does not benefit from the flexibility of a general purpose processor, and CRC calculations are specialized functions that are not transferable to other processing operations.

By analogous extension, as used herein, the term "protocol offload" may refer to processes that should be handled within the legacy networking stack because they are not specific to a user space application or task. In contrast, the term "protocol onload" may refer to processes that should be handled within a user space networking stack because they are specific to a user space application or task and benefit the overall performance. As a general qualitative criteria, tasks which are "fast" (e.g., generally UDP/TCP/IP based user space applications) are protocol onloaded to improve user performance; in contrast "slow" tasks (e.g., ARP, IPv6 Neighbor Discovery, Routing table updates, control path for managing interfaces, etc.) are protocol offloaded.

For example, consider Address Resolution Protocol (ARP) request handling; when an ARP request comes in, the host processor responds with a reply. However, the ARP request is non-specific to a user space application; rather the ARP reply concerns the holistic system. More generally, any networking process that is not specific to an application space can be implemented within the kernel under legacy techniques. Alternatively, any process that can be handled regardless of device state should remain with the kernel (e.g., the kernel persists across low power states, and is never killed).

By allowing the mature in-kernel networking stack to retain ownership of certain control logic (e.g. routing and policy table, interface configuration, address management), various embodiments of the present disclosure avoid "split-brain" behaviors. In other words, the kernel ensures that networking data and/or availability remains consistent regardless of the user space application availability.

Exemplary User Space Networking Stack—

Figure 7:
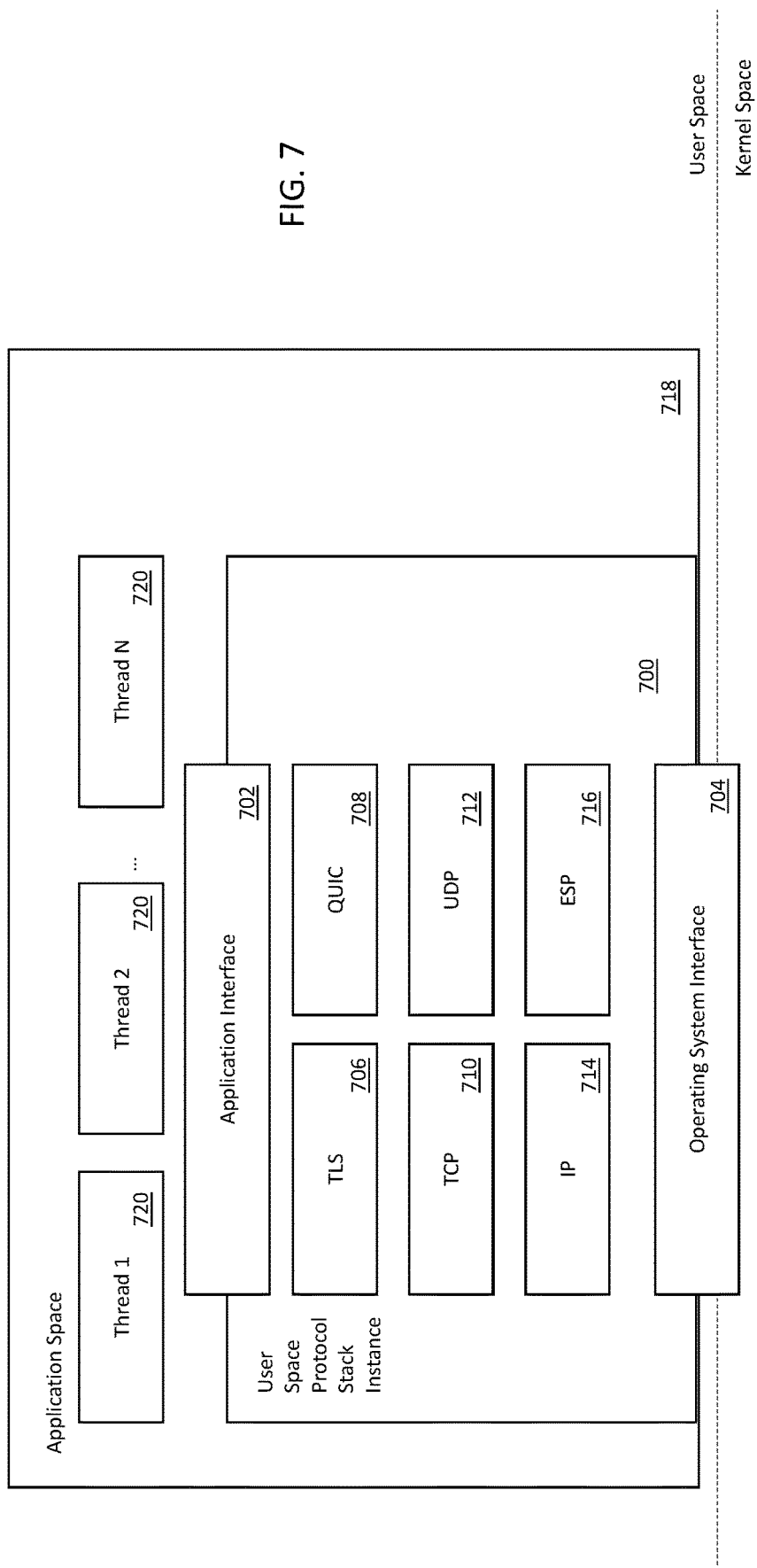
FIG. 7 is a logical block diagram of an exemplary user space networking stack, in accordance with the various aspects of the present disclosure.

Referring now to FIG. 7, one logical block diagram of an exemplary user space networking stack 700 is depicted. As shown, the user space networking stack 700 includes an application interface 702, and an operating system interface 704. Additionally, the user space networking stack includes one or more user space instances of TLS 706, QUIC 708, TCP 710, UDP 712, IP 714, and ESP 716. The disclosed instances are purely illustrative, artisans of ordinary skill in the related arts will readily appreciate that any other user space kernel extension and/or socket functionality may be made available within the user space networking stack 700.

In one exemplary embodiment, the user space networking stack 700 is instantiated within an application user space 718. More directly, the user space networking stack 700 is treated identically to any one of multiple threads 710 within the application user space 718. Each of the coexisting threads 720 has access to the various functions and libraries offered by the user space networking stack via a direct function call.

As a brief aside, each of the threads 720 reside within the same address space. By virtue of their shared addressability, each of the threads may grant or deny access to their portions of shared address space via existing user space memory management schemes and/or virtual machine type protections. Additionally, threads can freely transfer data structures from one to the other, without e.g., incurring cross domain penalties. For example, TCP data 710 can be freely passed to TLS 706 as a data structure within a user space function call.

As previously noted, the user space networking stack 700 may grant or deny access to other coexistent user space threads; e.g., a user space thread is restricted to the specific function calls and privileges made available via the application interface 702. Furthermore, the user space networking stack 700 is further restricted to interfacing the operating system via the specific kernel function calls and privileges made available via the operating system interface 704. In this manner, both the threads and the user space networking stack have access and visibility into the kernel space, without compromising the kernel's security and stability.

One significant benefit of the user space networking stack 700 is that networking function calls can be made without acquiring various locks that are present in the in-kernel networking stack. As previously noted, the "locking" mechanism is used by the kernel to enforce access limits on multiple threads from multiple different user space applications; however in the user space, access to shared resources are handled within the context of only one user application space at a time, consequently access to shared resources are inherently handled by the single threading nature of user space execution. More directly, only one thread can access the user space networking stack 700 at a time; consequently, kernel locking is entirely obviated by the user space networking stack.

Another benefit of user space based network stack operation is cross platform compatibility. For example, certain types of applications (e.g., iTunes®, Apple Music® developed by the Assignee hereof) are deployed over a variety of different operating systems. Similarly, some emerging transport protocols (e.g. QUIC) are ideally served by portable and common software between the client and server endpoints. Consistency in the user space software implementation allows for better and more consistent user experience, improves statistical data gathering and analysis, and provides a foundation for enhancing, experimenting and developing network technologies used across such services. In other words, a consistent user space networking stack can be deployed over any operating system platform without regard for the native operating system stack (e.g., which may vary widely).

Another important advantage of the exemplary user space networking stack is the flexibility to extend and improve the core protocol functionalities, and thus deliver specialized stacks based on the application's requirements. For example, a video conferencing application (e.g., FaceTime® developed by the Assignee hereof) may benefit from a networking stack catered to optimize performance for real-time voice and video-streaming traffics (e.g., by allocating more CPU cycles for video rendering, or conversely deprioritizing unimportant ancillary tasks). In one such variant, a specialized stack can be deployed entirely within the user space application, without specialized kernel extensions or changes to the kernel. In this manner, the specialized user space networking stack can be isolated from networking stacks. This is important both from a reliability standpoint (e.g., updated software doesn't affect other software), as well as to minimize debugging and reduce development and test cycle times.

Furthermore, having the network transport layer (e.g. TCP, QUIC) reside in user space can open up many possibilities for improving performance. For example, as previously alluded to, applications (such as TLS) can be modified depending on the underlying network connections. User space applications can be collapsed or tightly integrated into network transports. In some variants, data structure sizes can be adjusted based on immediate lower layer network condition information (e.g., to accommodate or compensate for poor network conditions). Similarly, overly conservative or under conservative transport mechanisms can be avoided (e.g., too much or not enough buffering previously present at the socket layer). Furthermore, unnecessary data copies and/or transforms can be eliminated and protocol signaling (congestion, error, etc.) can be delivered more efficiently.

In yet another embodiment, the exemplary user space networking stack further provides a framework for both networking clients and networking providers. In one such variant, the networking client framework allows the client to interoperate with any network provider (including the legacy BSD stack). In one such variant, the network provider framework provides consistent methods of discovery, connection, and data transfer to networking clients. By providing consistent frameworks for clients and providers which operate seamlessly over a range of different technologies (such as a VPN, Bluetooth, Wi-Fi, cellular, etc.), the client software can be greatly simplified while retaining compatibility with many different technologies.

Exemplary Proxy Agent Application Operation—

Figure 8:
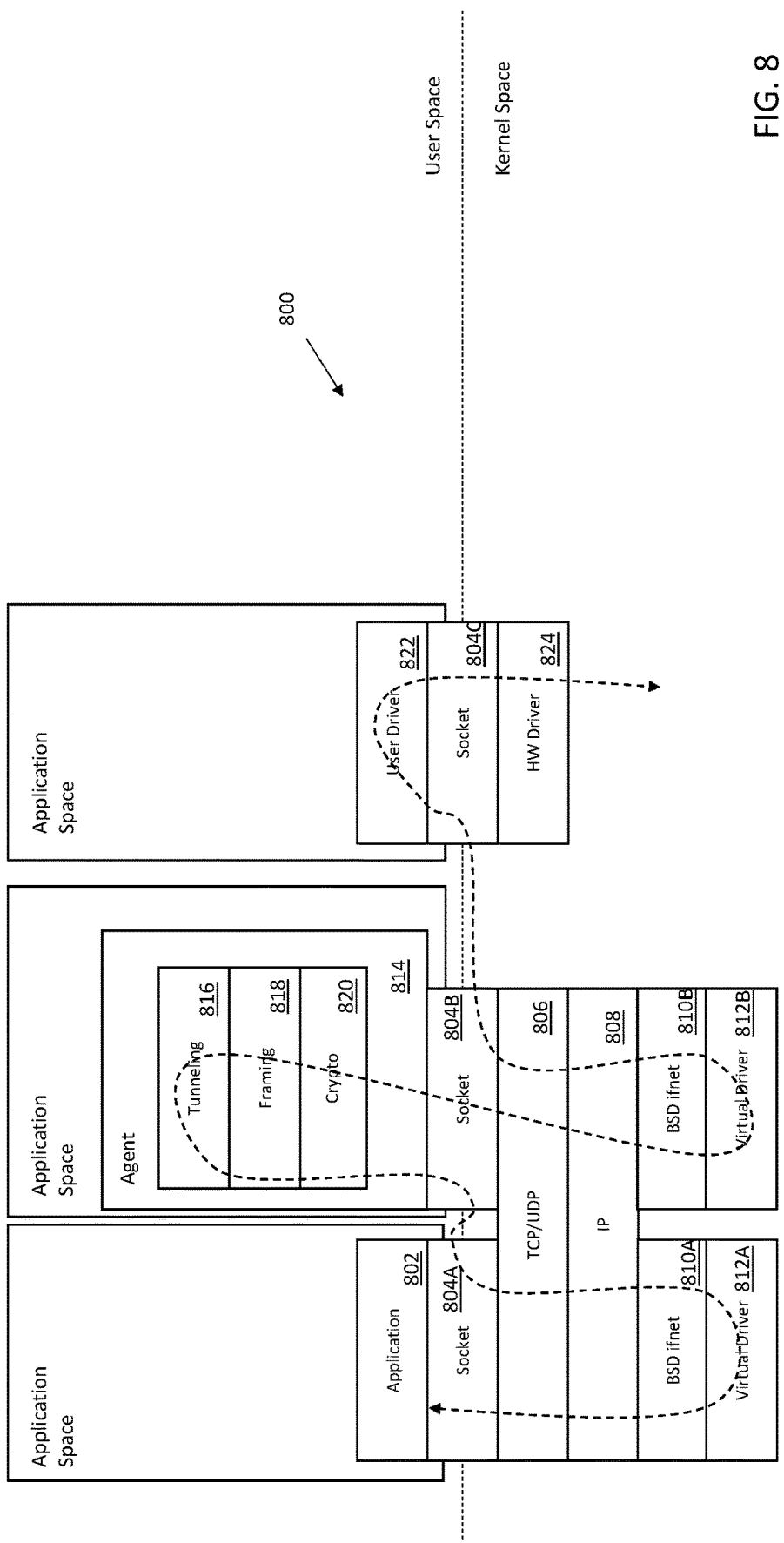
FIG. 8 is a logical flow diagram useful to summarize the convoluted data path taken for a prior art application using a proxy agent application within the context of the traditional networking stack, useful for explaining various aspects of the present disclosure.

FIG. 8 depicts one logical flow diagram useful to summarize the convoluted data path taken for a prior art application using a proxy agent application within the context of the traditional networking stack. As shown therein, an application 802 transmits data via a socket 804A to route data packets to a proxy agent application 814 via a TCP/IP 806/808 and a BSD network interface 810A. The data packets enter kernel space; this is a first domain crossing which incurs validation and context switching penalties.

Inside the kernel, the data is divided/copied/moved for delivery via the TCP/IP stack 806/808 to the BSD network interface 810A. The BSD network interface 810A routes the data to a virtual driver 812A. These steps may introduce buffering delays as well as improper buffer sizing issues such as buffer bloat.

In order to access the application proxy (which is in a different user space), the virtual driver reroutes the data to a second socket 804B which is in the different user space from the original application. This constitutes a second domain crossing, which incurs additional validation and context switching penalties.

In user space, the data enters an agent 814 which prepares the data for delivery (tunneling 816, framing 818, and cryptographic security 820). Thereafter, the proxy agent 814 transmits the prepared data via a socket 804B to route data packets to a user space driver 822 via the TCP/IP 806/808 and a separate BSD network interface 810B. Again, the data is passed through the socket 804B. This is a third domain crossing, with validation and context switching penalties.

Inside the kernel, the data is divided/copied/moved for delivery via the TCP/IP stack 806/808 to a BSD network interface 810B. The steps of The BSD network interface 810B routes the data to a virtual driver 812B. These steps introduce additional buffering delays as well as improper buffer sizing issues such as buffer bloat.

Finally, the virtual driver 812B reroutes the data to the user space driver (e.g., a Universal Serial Bus (USB) driver), which requires another socket transfer from 804B to 804C; the data crosses into the user space for the user based driver 822, and crosses the domain a fifth time to be routed out the USB Hardware (H/W) driver 824. Each of these domain crossings are subject to the validation and context switching penalties as well as any buffering issues.

Figure 9:
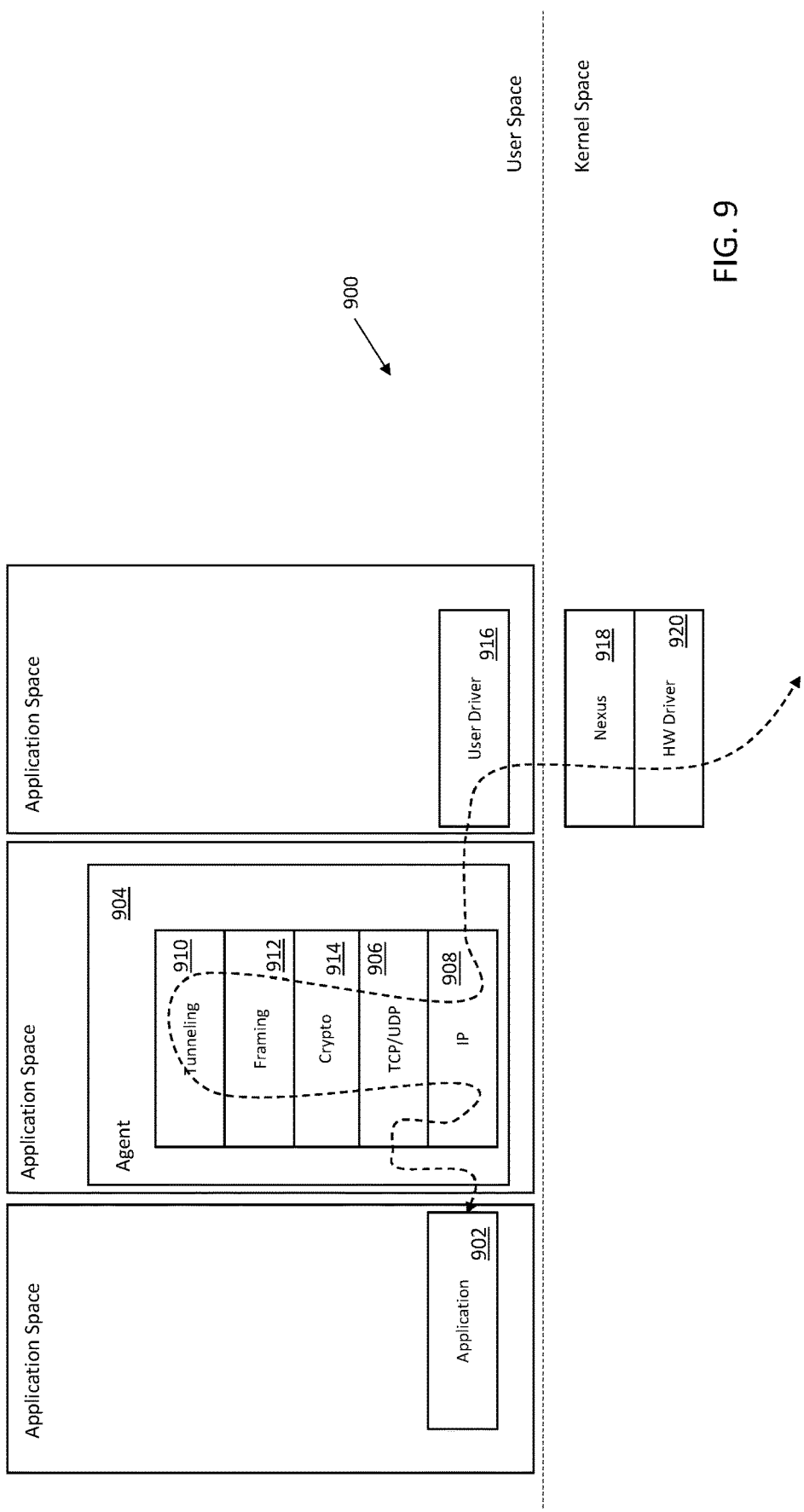
FIG. 9 is a logical flow diagram useful to summarize an exemplary proxy agent application within the context of the user space networking stack, in accordance with various aspects of the present disclosure.

FIG. 9 depicts one logical flow diagram useful to summarize an exemplary proxy agent application within the context of the user space networking stack, in accordance with the various aspects of the present disclosure.

As shown therein, an application 902 provides data via shared memory space file descriptor objects to the agent 904. The agent 904 internally processes the data via TCP/IP 906/908 to the tunneling function 910. Thereafter, the data is framed 912, cryptographically secured 914, and routed via TCP/IP 906/908 to the user driver 916. The user driver uses a channel I/O to communicate with nexus 918 for the one (and only) domain crossing into kernel space. Thereafter, the nexus 918 provides the data to the H/W driver 920.

When compared side-by-side, the user space networking stack 900 has only one (1) domain crossing, compared to the traditional networking stack 800 which crossed domains five (5) times for the identical VPN operation. Moreover, each of the user space applications could directly pass data via function calls within user memory space between each of the intermediary applications, rather than relying on the kernel based generic mbuf divide/copy/move scheme (and its associated buffering inefficiencies).

Active Queue Management—

Figure 10A:
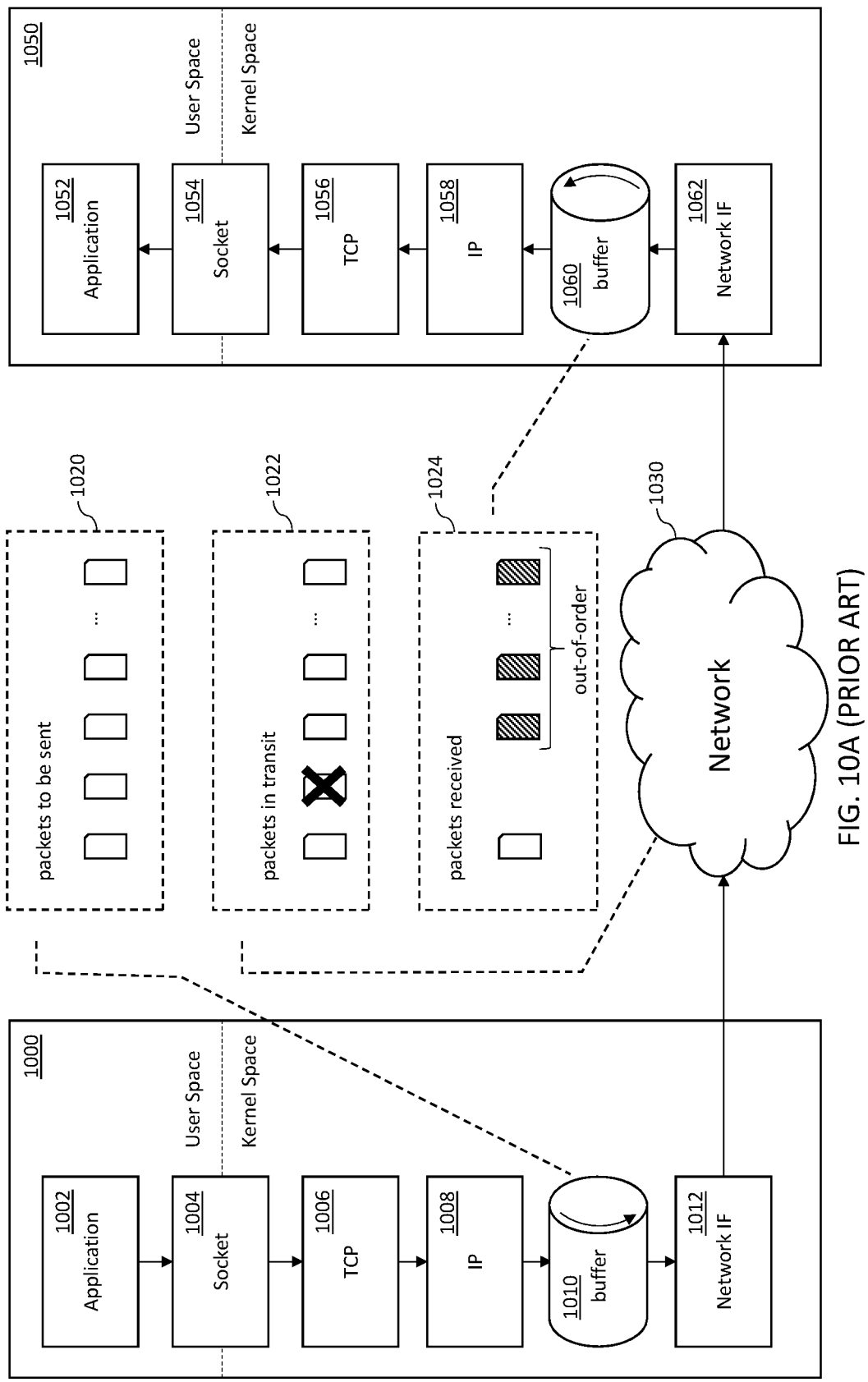
FIG. 10A is a logical block diagram illustrating prior art buffer bloat operation, useful for explaining various aspects of the present disclosure.

FIG. 10A illustrates a network that suffers from uncontrolled buffer bloat. As shown in FIG. 10A, a transmitting device 1000 is transacting packets with a receiving device 1050 over a network 1030. An application 1002 in the transmitting device 1000 sends data to be transmitted from user space to kernel space via socket 1004. This data is packetized for transmission once it reaches the TCP/IP layers 1006/1008 and these packets are temporarily stored in a transmission buffer 1010. Once these packets 1020 are ready to be sent, they are forwarded onto the network 1030 via a network interface 1012. These packets may be subsequently received by the network interface 1062 of the receiving device 1050. The received packets are temporarily stored in a receive buffer 1060 located on the receiving device. In an optimal transaction, these received packets are de-packetized in the receiving devices TCP/IP layers 1056/1058, transmitted into user space from kernel space via socket 1054, and the data is ultimately fed to the application 1052 for which these transmitted packets were intended.

As shown in FIG. 10A, the network 1030 is experiencing congestion and/or packet loss. The Internet Protocol has been designed according to a best-effort delivery service. Additionally, the Internet Protocol allows for routers to drop packets if the router or a network segment is too busy to deliver the data in a timely manner. This network congestion and/or packet loss is illustrated by the packets in transit 1022. Unfortunately, the packets received 1024 by the receive buffer 1060 must be placed in-order prior to be transmitted into the upper layers of the receiving device. These dropped packets must be re-requested by the receiving device 1050 and ultimately re-transmitted. However, during this interim period of time, the receive buffer 1060 may continue to grow. In systems with heavy network congestion, the receive buffer 1060 can grow uncontrollably resulting in so-called "buffer bloat".

Figure 10B:
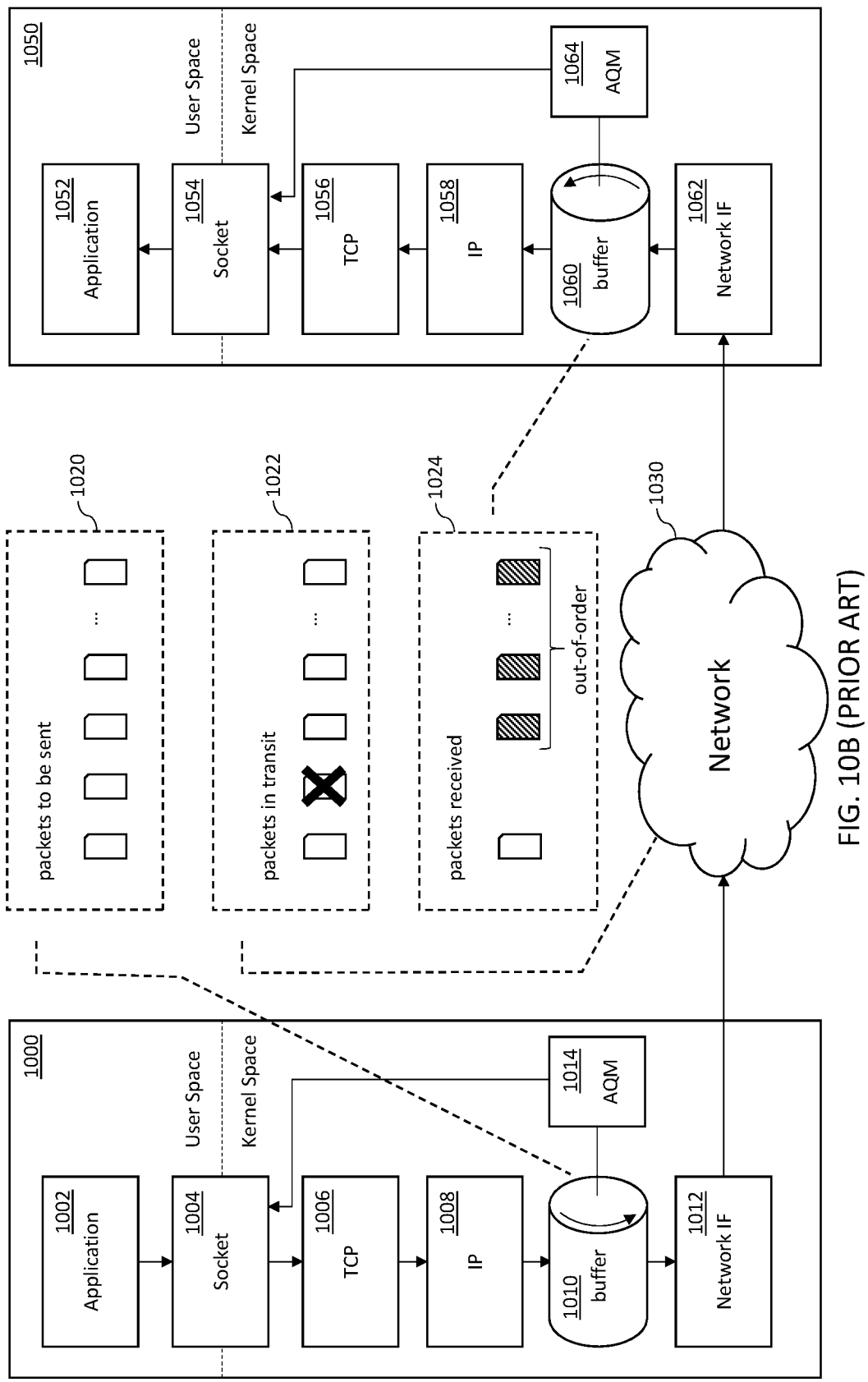
FIG. 10B is a logical block diagram illustrating prior art active queue management, useful for explaining various aspects of the present disclosure.

FIG. 10B illustrates one such solution to the problem of "buffer bloat" via the use of active queue management (AQM) buffer management. As shown in FIG. 10B, once packets start to be dropped in transit 1022, the transmitting device 1000 will begin to receive packet re-transmission requests from the receiving device 1050. Additionally, the receiving device 1050 receive buffer 1060 will also begin to grow due to the requirement that these packets be placed in order prior to being sent to the upper layers of the receiving device 1050. Accordingly, AQM 1014, 1064 is used to track the size of the transmit 1010 and receive buffers 1060. When a buffer (e.g., the transmit buffer 1010) starts to grow, the AQM 1014, 1064 will notify the socket 1004, 1054 with "backpressure".

Backpressure refers to what is essentially a concentration of network traffic. Backpressure also allows the kernel to notify the user space (without exposing kernel data) that the network connection cannot sustain more data. Once the socket 1004 has been notified of the backpressure, the user space will slow down (or stop) delivery of packets from the application 1002 until the network congestion has eased. Once the network congestion has eased, the AQM 1014 may indicate an update that allows for the application 1002 to continue on with the transmission of data. The AQM mechanism is also referred to as "admission control". Admission control refers to the ability of the kernel space to inform the user space of underlying network congestion, without exposing sensitive kernel space data to user space. Unfortunately, the transmission buffer 1010 will continue to receive packets from the TCP/IP layers 1006, 1008 as this packetization is already enqueued. In other words, since the AQM 1014 notifies the socket 1004 directly, data that is already being processed in the kernel space will continue to be processed and stored in the transmission buffer 1010.

User Space Networking Stack AQM Optimizations—

Existing implementations of AQM enable the network to provide AQM flow control and advisory information to the in-kernel stack. However, under the traditional networking paradigm, the in-kernel stack is unaware of the applications associated with the data. In contrast, AQM flow control and advisory information may be further tailored and improve user space networking stacks because the user space network can quickly identify which flows should be culled (or preserved) on the basis of application considerations.

In one exemplary embodiment, the user space networking stack can implement AQM to prevent buffer bloat conditions intelligently based on which flows should be preserved and/or which flows can be culled. More directly, by intelligently selecting AQM culling based on application considerations, the user space networking stack can achieve the benefits of both AQM as well as flow priorities.

Moreover, AQM in the uplink direction can also be improved. In some embodiments, the user space network stack can further tailor flow control and advisory before transmission by checking if the flow is admissible on the channel prior to the transport layer generating packets.

In one embodiment, legacy AQM functionality is preserved for both user space networking stacks and in-kernel stacks. In one such implementation, the in-kernel stack can get synchronous flow advisory feedback in context of the send/write operation.

In other words, a common AQM functionality for a network interface hosting multiple and differing stack instances (user space protocol stack and in-kernel protocol stack) is desired. The in-kernel BSD stack uses mbuf packets whereas the user space stack instance uses user space network stack infrastructure packets. The flow control and advisory feedback mechanism also differ for these stacks due to their placement.

In one variant, the user space network stack infrastructure flow-switch nexus is a common entry point for the in-kernel BSD stack and the user space stack. The flow-switch nexus handles the different packet descriptor schemes and converts them to the packet descriptor scheme being used by the underlying network driver before enqueuing the packets to the AQM queues. It also implements the appropriate mechanisms to provide flow control and advisory feedback from the AQM queues to the different stack instances.

Figure 11:
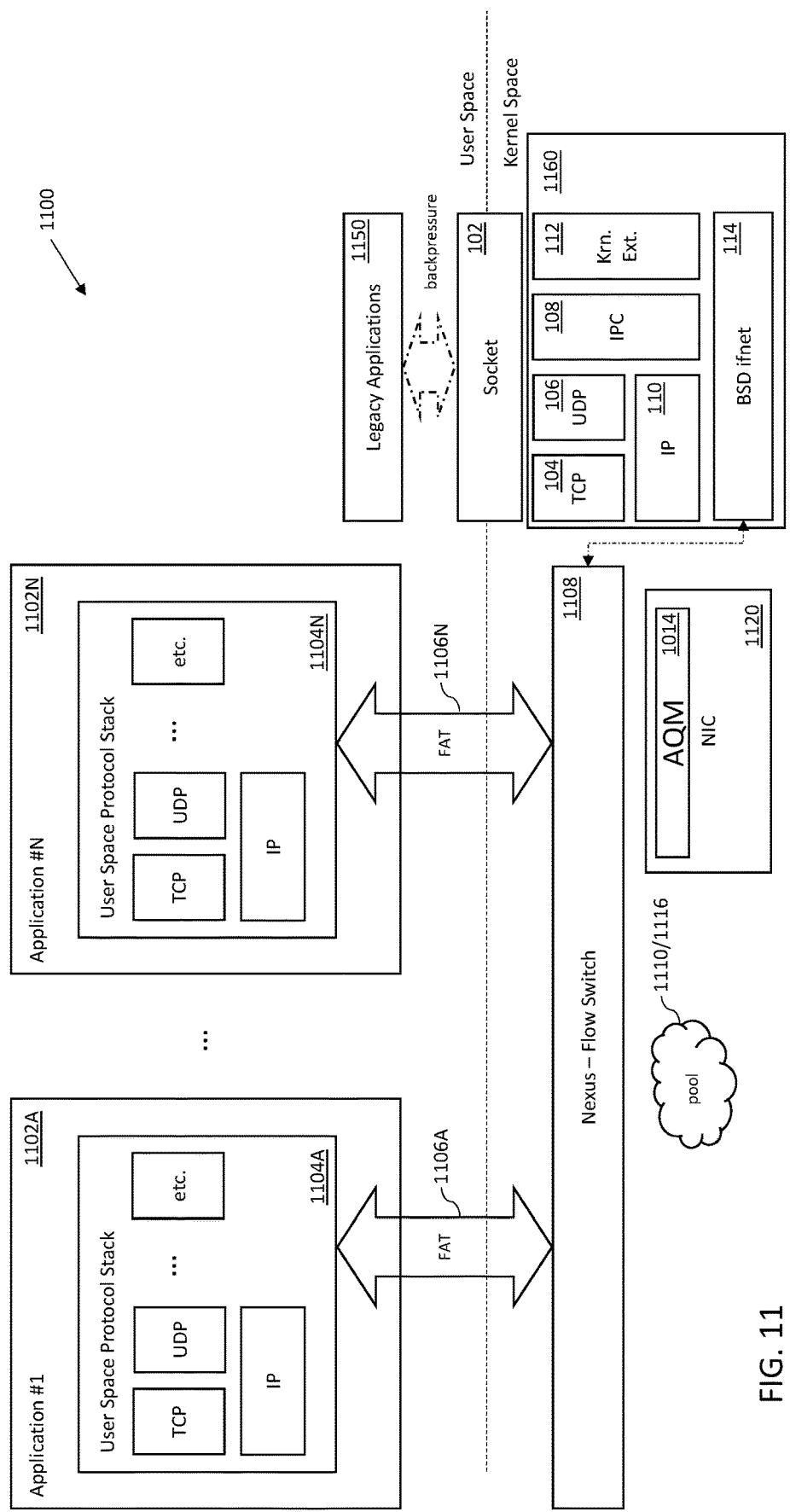
FIG. 11 is a logical block diagram illustrating an exemplary computing device that implements both a flow advisory table as well as legacy active queue management, useful for explaining various aspects of the present disclosure.

Referring now to FIG. 11, one exemplary implementation for a system 1100 that includes a legacy BSD communications stack 1160 as well as user space communication stacks 1104 for use in accordance with embodiments of the present disclosure is now shown and described in detail. The system 1100 may take on any number of electronic device forms including, without limitation, a desktop computer, a laptop computer, a tablet, a smart phone, an audio/visual computer, smart wearable devices, and other computerized devices. For example, the system 1100 may be embodied within any of the Assignee's products (e.g., MacBook®, iMac®, iPad®, Apple Watch®, Apple TV® and iPhone®, etc.).

This exemplary system 1100 may be implemented through the use of a non-transitory computer-readable medium (e.g., a computer-readable apparatus) which may be embodied as software, hardware, or combinations of the foregoing. The non-transitory computer-readable medium may include one or more computer programs with computer-executable instructions, that when executed by, for example, one or more processing apparatus may implement one or more of the methodologies described subsequently herein. Moreover, while a specific architecture is shown in FIG. 11, it would be readily apparent to one of ordinary skill given the contents of the present disclosure that the illustrated topology shown in, for example, FIG. 11 may be readily modified to include one or more applications 1102, one or more user space protocol stacks 1104, one or more pools of resources 1110 associated with a respective application, one or more flow switches 1108, one or more pool of resources 1110 managed by, for example, one or more drivers (e.g., a driver associated with a network interface controller (NIC) 1120), and one or more legacy applications 1150 that utilize a legacy BSD communications stack 1160. These and other variants would be readily understood by one or ordinary skill given the contents of the present disclosure with the illustration contained within FIG. 11 merely being exemplary.

In the illustrated system 1100, a network interface controller 1120 has been provided with an AQM 1014 that may not only function in accordance with legacy AQM functionality as was described with respect to FIG. 10B supra, but is also capable of providing updates to a shared flow advisory table (FAT) 1106. The FAT 1106 is updated by the kernel that has write-privileges and can be read by, for example, a user space protocol 1104, which only has read-only privileges for the FAT 1106. Each user space protocol stack 1104A, 1104N can determine based on the FAT 1106, the current backpressure associated with network conditions. The flow statistics contained within the FAT 1106 may be anonymized so as to not expose sensitive information to the user space applications 1102A, 1102N. The FAT 1106 may implement an eventing methodology in some implementations. The eventing methodology notifies the user space protocol stacks 1104 that an event has occurred; however, it is up to individual applications 1102 whether to read the contents of the FAT 1106 responsive to the notification. Additionally, as each user space application 1102 has its own user space stack, it can determine what to do with the backpressure information it reads from the FAT 1106. In some implementations, each user space protocol stack 1104A, 1104N is only able to read from a respective FAT 1106A, 1106N that has been assigned to it. In other words, application #1 1102A is not able to read from FAT 1106N associated with application #N 1102N and vice versa.

As a brief aside, as previously noted AQM 1014 seeks to prevent buffering data unnecessarily (e.g., to prevent buffer bloat). However, legacy AQM is a kernel space function and only has visibility of generic mbuf data. Additionally, user applications are not aware of AQM functions. However, as embodiments of the present disclosure implement user space protocol stacks 1104, additional functionality may be enabled that is not present in the prior art. For example, various embodiments prevent buffering of data based on user space considerations. These user space considerations may be identified utilizing packet descriptor schemes. For example, packets may be identified as time sensitive, non-time sensitive, high priority, low priority, etc. As but one non-limiting example, consider an application that has a time sensitivity (e.g., for real-time streaming applications). Time sensitive data that is buffered beyond a given amount of time may be considered "stale". In other words, even if received later, this time sensitive data will be worthless to the receiver of this data. Thus, rather than buffering data that has been considered "stale" which could make network congestion worse, the timer sensitive application may just experience packet loss and this stale data may be simply discarded from the buffers. In other words, managed packet loss may actually benefit everyone by reducing unnecessary buffering. Applications that are exposed to back pressure and that can wait can simply discard this data from the transmission buffers, thereby reducing network congestion for everyone else, which assists the network in reducing congestion.

Flow Control and Advisory—

As previously noted, the unique shared memory of the channel I/O and flows (when compared to prior art 1:1 socket based solutions) requires different methods for bandwidth sharing. Consequently, in one exemplary embodiment of the present disclosure, the flow manager includes a mechanism to moderate flow control for each flow so as to efficiently use the overall channel for the user space networking stack.

In one such implementation, the user space network stack infrastructure provides a packet I/O mechanism to user space stack. Additionally, the packet I/O mechanism includes Active Queue Management (AQM) functionality for the flows associated with the user space network stack. AQM culls packets to ensure that each flow does not approach its maximum size (i.e., to prevent a single flow from dominating the shared network interface bandwidth). Moreover, since packet culling may require removing "good" packets, the AQM module trades off overall channel performance for each individual flow performance. In some cases, a flow may be decimated for the benefit of the channel, or conversely the overall channel efficiency may be reduced to benefit a flow.

As a related aspect, the unique shared memory of the channel I/O and flows also requires different schemes for efficiently providing flow advisory feedback to user space stacks. More directly, the various advisory information for the flows of the channel are separate from the channel's overall performance.

As noted above, the user space network stack infrastructure may support a packet I/O mechanism that includes Active Queue Management (AQM) functionality for the flows associated with the user space network stack. In one such variant, the AQM functionality in the user space network stack utilizes a kernel event mechanism with a specific type to perform flow advisory reporting (e.g., that a flow has started, stopped, etc.)

As a brief aside, a flow advisory on a connection is received from AQM when one of the following two conditions is true: 1. the send rate of a TCP connection increases above the bandwidth supported on the link, or 2. the available bandwidth on a wireless link, which is the first hop, from the device goes down.

As a brief aside, flow advisory conditions present problems because sending more packets will accumulate packets in the interface queue and will increase the latency experienced by the application. Otherwise, it might cause packet drops which will reduce the performance because the TCP sender will have to retransmit those packets. By using the flow-advisory mechanism, the TCP senders can adapt to the bandwidth available without seeing any packet loss or any loss of performance. The interface queue will never drop a TCP packet but it will only send a flow advisory to the connection. Because of this mechanism, buffering in device drivers was reduced by a significant amount resulting in improved latency for all TCP connections on the device.

In other words, in a user space TCP/IP stack architecture, the stack instance and the network driver are operating in different domains (user space & kernel space). An efficient mechanism is needed for the user space stack to determine the admissibility state of a given flow in the stack instance.

In one embodiment, user space network stack infrastructure channels provide a flow advisory table in shared memory which is updated by the kernel and consulted by the user space stack to flow control a given flow. In essence, this table provides admission control information to the user space stack.

In a user space TCP/IP stack architecture, the stack instance and the network driver are operating in different domains (user space & kernel space). An efficient mechanism is needed to signal the user space stack from kernel space to "flow control" or "resume" a given flow in the stack instance.

In one embodiment, user space network stack infrastructure channels utilize kernel event mechanism with a specific type to indicate the user space stack about any updates to the flow advisory state in kernel which is reflected in the "flow advisory table" maintained in shared memory. Each row in the table represents information about the flow, as well as the advisory state (e.g. flow-controlled, etc.).

Figure 12:
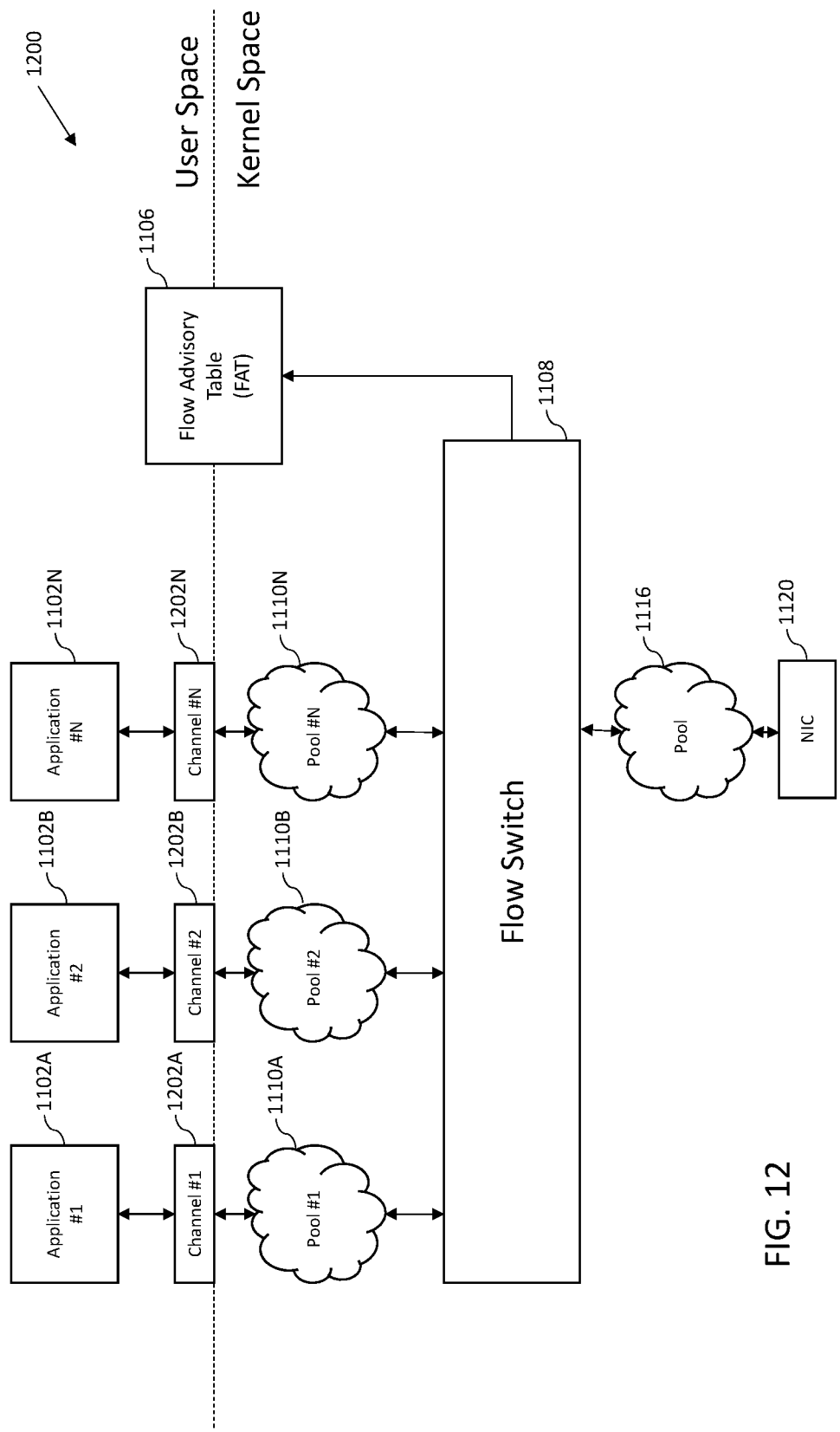
FIG. 12 is a logical block diagram illustrating an exemplary computing device that implements a flow advisory table, useful for explaining various aspects of the present disclosure.

Referring now to FIG. 12, another exemplary implementation for a system 1200 that utilizes user space communication stacks for use in accordance with embodiments of the present disclosure is now shown and described in detail. Similar to the system 1100 shown in FIG. 11, the system 1200 may take on any number of electronic device forms including, without limitation, a desktop computer, a laptop computer, a tablet, a smart phone, an audio/visual computer, smart wearable devices, and other computerized devices. For example, the system 1200 may be embodied within any of the Assignee's products (e.g., MacBook®, iMac®, iPad®, Apple Watch®, Apple TV® and iPhone®, etc.).

This exemplary system 1200 may be implemented through the use of a non-transitory computer-readable medium (e.g., a computer-readable apparatus) which may be embodied as software, hardware, or combinations of the foregoing. The non-transitory computer-readable medium may include one or more computer programs with computer-executable instructions, that when executed by, for example, one or more processing apparatus may implement one or more of the methodologies described subsequently herein. Moreover, while a specific architecture is shown in FIG. 12, it would be readily apparent to one of ordinary skill given the contents of the present disclosure that the illustrated topology shown in, for example, FIG. 12 may be readily modified to include one or more applications 1102, one or more channels 1202, one or more pools of resources 1110 associated with a respective application, one or more flow switches 1108, and one or more pool of resources 1116 managed by, for example, one or more drivers (e.g., a driver associated with a network interface controller (NIC) 1120), and one or more FAT 1106. These and other variants would be readily understood by one or ordinary skill given the contents of the present disclosure with the illustration contained within FIG. 12 merely being exemplary.

In some implementations, the FAT 1106 notifies the user space applications 1102 of network congestion and/or packet loss. The FAT 1106 notification may utilize the aforementioned eventing methodology in some variants. The user space applications 1102 behavior to this notification may differ dependent upon whether a given user space application is in the foreground or the background. As a brief aside, the terms "foreground" and "background" as used herein, refer to the priority assigned to programs running in, for example, a multitasking computing environment. For example, foreground applications are applications that a user is currently interacting with (e.g., viewing, providing input to, etc.), while background applications are applications that a user is not currently interacting or where portions of the application have otherwise been suspended. For example, consider an operating scenario where application #1 1102A is currently operating in the foreground, while application #2 1102B and application #N 1102N are operating in the background. Accordingly, when the FAT 1106 notifies the user space applications 1102 of network congestion and/or packet loss, application #1 1102A operating in the foreground may continue to buffer packets for transmission, while application #2 1102B and application #N 1102N operating in the background may halt the transmission of packets to the transmission buffer for transmission. These and other variants would be readily apparent to one of ordinary skill given the contents of the present disclosure.

Figure 13:
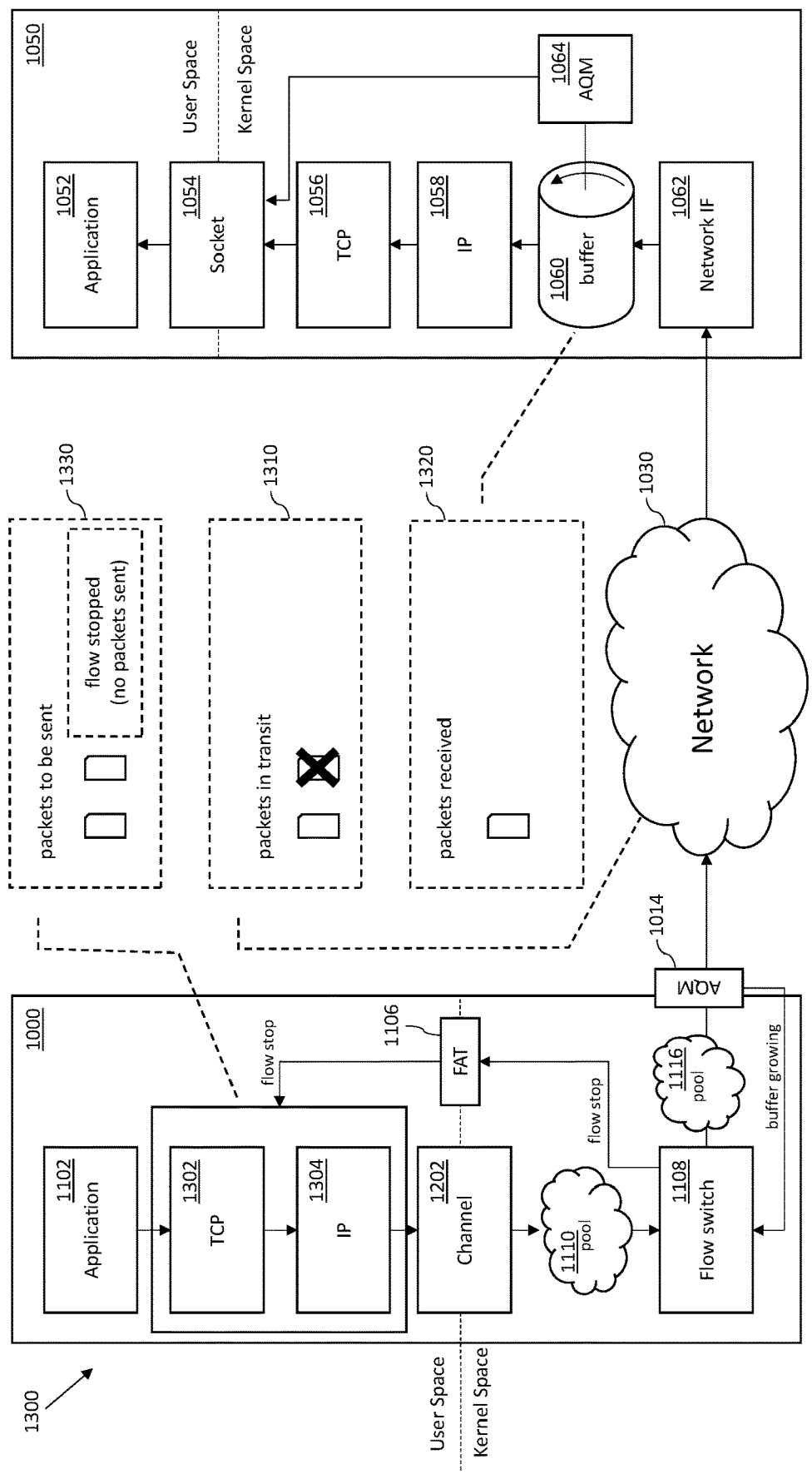
FIG. 13 is a logical block diagram illustrating an exemplary system that implements the flow advisory table of FIGS. 11 and 12, useful for explaining various aspects of the present disclosure.

As previously alluded to, traditional BSD stacks hide kernel operations from the user space application (for security reasons, etc.), and user space application information is hidden from the kernel (the kernel only sees generic mbuf data containers). In one embodiment, the shared memory of the FAT 1106 can be used to provide information across the kernel user space border. Ideally, the FAT 1106 should provide user space application information to the flow switch 1108, while protecting sensitive information from the user space application. Referring now to FIG. 13, one exemplary operating scenario for the FAT 1106 is shown and described in detail. In the system 1300 depicted in FIG. 13, packets are being sent from a transmitting device 1000 to a receiving device 1050 over a network 1030. As the network 1030, begins experiencing network congestion and/or packet loss, the AQM buffer 1014 begins to grow. The AQM 1014 will notify the flow switch 1108, which in turn notifies the FAT 1106 to stop the flow of packets from the application.

Herein lays one salient advantage of the system 1300 of FIG. 13 as compared with the system depicted in FIG. 10B. As the FAT 1106 in FIG. 13 notifies the TCP/IP stack 1302, 1304 in user space, once the FAT 1106 notifies of a flow stop, the cessation of packets delivered to the channel 1202 occurs immediately. Contrast with the operation of AQM in FIG. 10B in which packets are already enqueued and hence will continue to provide packets to the transmission buffer after the AQM notifies the legacy BSD stack of network congestion/packet loss. In one exemplary implementation, packets in transit 1310 experience packet loss. This packet loss may be due to, for example, network congestion. Accordingly, the receiving device 1050 will receive packets 1320 and will transmit a retransmission request for the missing packet(s), which may be indicative of network congestion. Once the FAT 1106 notifies the TCP/IP stack 1302, 1304 that the flow should be stopped, the cessation of packets being delivered to the channel 1202 occurs immediately.

Figure 14:
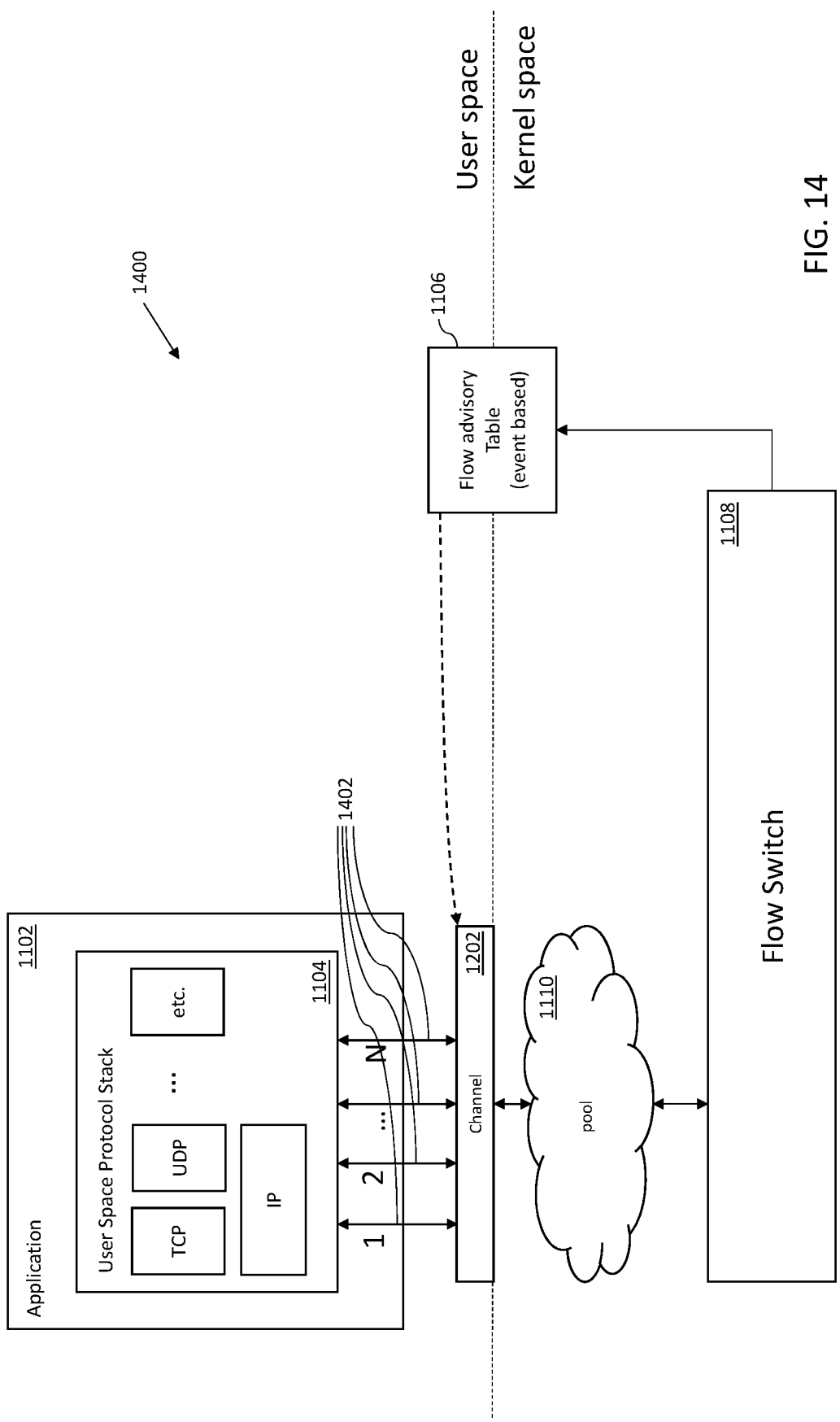
FIG. 14 is a logical block diagram illustrating an exemplary computing device that implements a flow advisory table in conjunction with a plurality of flows per channel, useful for explaining various aspects of the present disclosure.

Referring now to FIG. 14, another exemplary implementation for a system 1400 that utilizes user space communication stacks for use in accordance with embodiments of the present disclosure is shown and described in detail. Similar to the systems 1100, 1200 shown in FIGS. 11 and 12, the system 1400 may take on any number of electronic device forms including, without limitation, a desktop computer, a laptop computer, a tablet, a smart phone, an audio/visual computer, smart wearable devices, and other computerized devices. For example, the system 1400 may be embodied within any of the Assignee's products (e.g., MacBook®, iMac®, iPad®, Apple Watch®, Apple TV® and iPhone®, etc.).

This exemplary system 1400 may be implemented through the use of a non-transitory computer-readable medium (e.g., a computer-readable apparatus) which may be embodied as software, hardware, or combinations of the foregoing. The non-transitory computer-readable medium may include one or more computer programs with computer-executable instructions, that when executed by, for example, one or more processing apparatus may implement one or more of the methodologies described subsequently herein. Moreover, while a specific architecture is shown in FIG. 14, it would be readily apparent to one of ordinary skill given the contents of the present disclosure that the illustrated topology shown in, for example, FIG. 14 may be readily modified in accordance with various aspects described herein.

In one exemplary embodiment, a user space stack 1104 associated with an application 1102, opens a channel 1202 according to a channel schema which creates one or more arenas. In some implementations, the channel schema is application dependent as-is described in co-owned and co-pending U.S. patent application Ser. No. 16/368,338 filed Mar. 28, 2019 and entitled "Methods and Apparatus for Memory Allocation and Reallocation in Networking Stack Infrastructures", the contents of which were incorporated supra. The schema may include flow advisory statistics. Additionally, as the one or more arenas are owned by the channel 1202, which is in turn owned by the user space protocol stack 1104, each user space protocol stack 1104 may have its own statistics that are only viewable by the respective user space protocol stack 1104. Additionally, these statistics are read-only for the user space protocol stack 1104, while the kernel can update the statistics. Such an arrangement ensures the user space protocol stack 1104 cannot affect kernel operation.

In some implementations, a given application 1102 may have a plurality of flows 1402 associated with the application 1102. The FAT 1106 may include data for all of the flows 1402. Each of the plurality of flows 1402 may be separately categorized with different packet description schemes. For example, a real-time video application may have a time sensitive video flow as well as a time insensitive bulk data flow. Accordingly, the time sensitive video flow may be prioritized over the time insensitive bulk data flow. Such a mechanism enables intelligent flow control for the system 1400. Accordingly, exemplary AQM mechanisms in the flow switch 1108 (i.e., in kernel space) can dynamically adjust which types of packet flows 1402 should be halted, decimated, allowed to proceed, etc. This can be used to selectively improve AQM operation. In some implementations, there can be varying gradations of priority associated with the flows 1402 for a given application 1102. One flow might be given the highest priority, another flow the lowest priority, and yet other flows, intermediate gradations of priority between the highest priority and the lowest priority. These and other variations would be readily apparent to one of ordinary skill given the contents of the present disclosure.

One exemplary embodiment of the FAT 1106 provides selective information itemized for each flow. For example, this information may be used by the user space application 1102 to change operation upstream (e.g., by changing channel quality, handling of packet loss, etc.). As a brief aside, network congestion usually affects multiple flows at the same time, thus in some implementations, it may be unnecessary to update the application 1102 whenever a single flow (of the plurality of flows 1402) changes. Excessive switching between a first application and a second application may cause unnecessary churn (e.g., some applications 1102 may not immediately care that a network condition has changed) and hence, the FAT 1106 may provide varying gradations of thresholding, implementation of timers, etc. prior to halting a particular flow or flows. In some implementations, the application 1102 may be notified that a network condition has changed; however, the reaction to that notification may be application specific. In other words, only those applications that care can respond to changes in network conditions. These and other variations would be readily apparent to one of ordinary skill given the contents of the present disclosure.

Methods—

Figure 15:
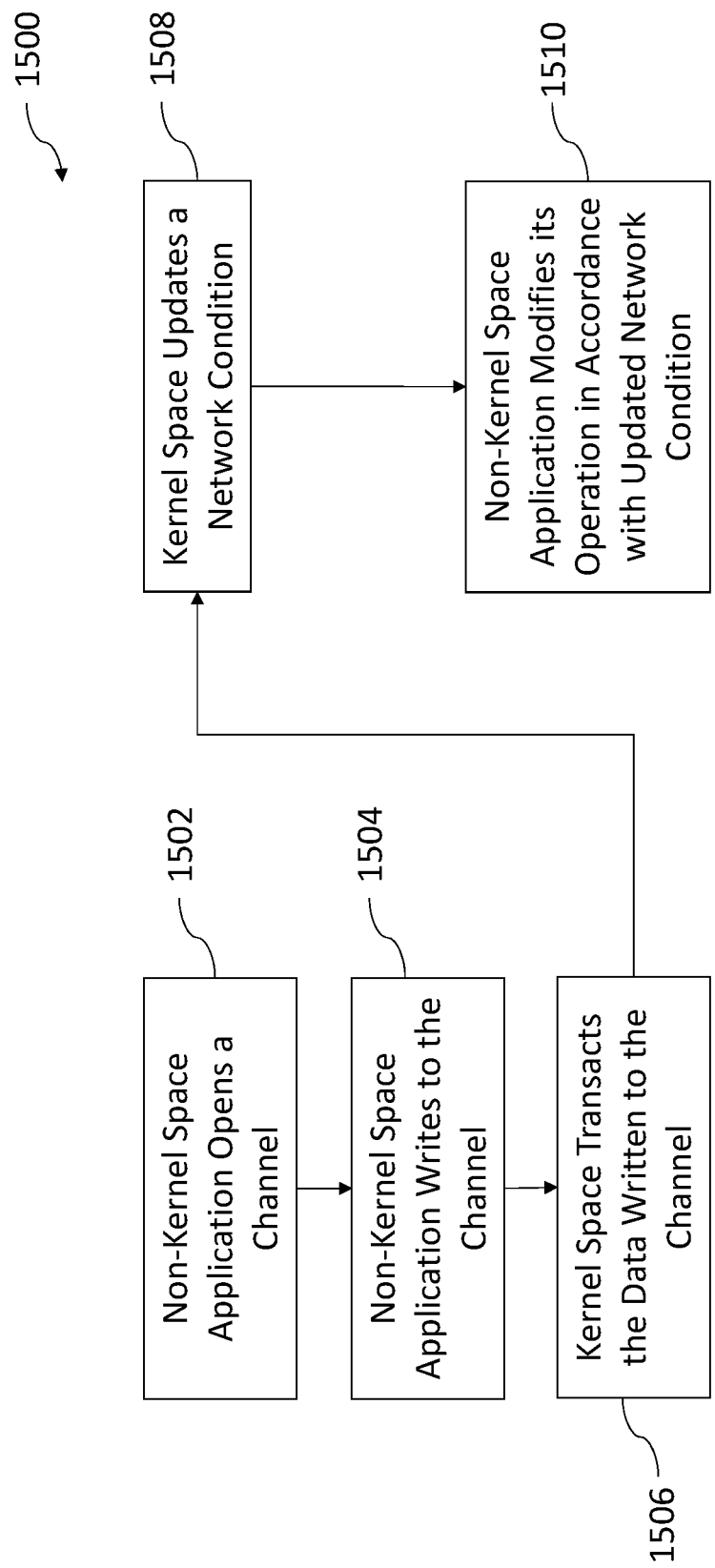
FIG. 15 is a generalized method for implementation of active queue management in user space networking application, in accordance with various aspects of the present disclosure.

Referring now to FIG. 15, a method 1500 for active queue management in user space networking is shown and described in detail. At step 1502, a non-kernel space application opens a channel that includes a network condition data structure. In some implementations, the network condition data structure includes both a legacy AQM as well as a FAT. In other implementations, the network condition data structure only includes a FAT. In some implementations, the FAT may have different access permissions between user space and kernel space. For example, the user space may only have read privileges for the FAT, while the kernel space has read-write privileges for the FAT. In some implementations, the kernel space may include both read and write privileges for the FAT. In some implementations, the FAT may be shared across two or more applications. In other words, one entry in a FAT may cause two or more applications to respond to that entry. In some implementations, this response may differ between the two or more applications. In such an implementation, the entry within the FAT may be anonymized so as to ensure security across the applications that share a given FAT.

In one embodiment, the opening of a channel includes requesting a channel schema for the non-kernel space application. Responsively, the nexus provides an application-specific channel schema for the non-kernel space application.

In some implementations, the opening of a channel includes re-using a previously used channel, or even re-using a channel that is currently associated with another non-kernel space application. In other words, two (or more) non-kernel space applications may share a channel.

In some implementations, the opened channel may support multiple flows. For example, the channel may include a high priority flow, a low priority flow, and one or more intermediate priority flows. In one variant, each flow is associated with a unique user space consideration. Common user space considerations include useful life for the packets contained within that flow, ability for data within that flow to be decimated (e.g., a given flow may support differing quality of service), susceptibility of data to latency, etc. While embodiments of the present disclosure are primarily presented in the context of a single network interface, it would be readily apparent to one of ordinary skill given the contents of the present disclosure that multiple network interfaces may be substituted with equal success (e.g., IP-connectivity over cellular and IP-connectivity over Wi-Fi, etc.).

At step 1504, the application writes data to the channel. In some implementations, data written to the channel may have different delivery requirements. For example, data may be characterized by time sensitivity (e.g., must be used within a certain amount of time otherwise will become stale, time-insensitive data, video data, text data, audio data, etc.). In some implementations, the data includes packet data. For example, one type of packet data may include TCP/IP packet data. Other kinds of data may include, e.g., UDP/IP data. Differing types of packet data may be treated differently. For example, TCP/IP packet data is best effort, while UDP/IP data does not provide for any sort of delivery guarantee. In some implementations, the data may include user specific data. User specific data may have user configured setting. The data may also include control data in some implementations. Control data may have network configured settings. Other types of data may be readily substituted with equal success.

At step 1506, the kernel space application transacts that data written to the channel via a network. In some implementations, the network consists of an external network. For example, the external network may include one or more of a wired Ethernet network, a Wi-Fi network, a cellular network, a Bluetooth network, a near field network (e.g., near-field communication (NFC)), etc. In some implementations, the network consists of an internal network in addition to, or alternatively from, the aforementioned external networks. For example, the internal network may consist of inter-device application-to-application communications.

In some implementations, the data transacted may have re-transmission requirements (e.g., TCP/IP). For example, re-transmission requirements may impact network congestion. In some variants, the network congestion may be calculated internally. In other variants, the network congestion may be provided by the network, or otherwise inferred. For example, the network congestion may be measured by a number of retransmission requests, a calculated bit error rate, as well as other types of network congestion measurements. In some implementations, the network congestion may be identified via an out-of-band process. In other words, network congestion for a data stream may be identified from a separate, dedicated channel.

At step 1508, the kernel space updates a network condition data structure with indicia of network conditions. These updated network conditions may be event based (e.g., use the aforementioned eventing methodology), may be channel based, may be flow based, and/or may be application based. In some implementations, the indicia may be a value (e.g., a value between one and ten). In other implementations, the indicia may be a relative value, may be an absolute value, may be based on priority and/or cost, etc. In some variants, the indicia can be a status value (e.g., ready and not ready, etc.).

At step 1510, the non-kernel space application modifies its operation in accordance with the updated network condition. For example, this modification may include sending less data, stopping the transmission of data, suspension of the application, ignoring the updated network condition (e.g., in accordance with a given priority for a flow or application), entering packet loss conditions, reprioritizing a given priority for a flow or application (e.g., increasing priority or decreasing priority), etc.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for active queue management in user space networking stacks, the method comprising:
   opening a channel for a non-kernel space application, the non-kernel space application including a user space networking stack;
   enabling writing, via the user space networking stack, data to the channel;
   transacting, via a kernel space networking stack, the data written to the channel over a network connection;
   responsive to a reduction in performance of the network connection, updating, via a function of the kernel space networking stack, the user space network stack of a network condition for the network connection by notifying a data structure shared by at least the user space networking stack and the kernel space function, the data structure configured to notify the user space networking stack of the network condition, and prevent further writing of data to the channel via the user space networking stack; and
   modifying operation of the non-kernel space application with respect to the prevention of further writing of the data to the channel in response to the updating of the network condition for the network connection.

2. The method of claim 1, wherein the updating of the network condition for the network connection comprises writing to a flow advisory table.

3. The method of claim 1, further comprising implementing legacy active queue management for legacy applications that include the kernel space networking stack.

4. The method of claim 2, wherein the updating of the network condition for the network connection further comprises using an eventing methodology to notify the non-kernel space application.

5. The method of claim 4, wherein the using of the eventing methodology comprises selectively accessing the flow advisory table by the non-kernel space application.

6. The method of claim 1, further comprising generating, by the non-kernel space application, a plurality of flows for the opened channel.

7. The method of claim 6, further comprising prioritizing one of the plurality of flows over another one of the plurality of flows.

8. The method of claim 7, wherein the modifying of the operation of the non-kernel space application comprises discarding packets associated with the another one of the plurality of flows, while keeping packets associated with the one of the plurality of flows.

9. The method of claim 2, further comprising accessing the flow advisory table, by the non-kernel space application, using read-only privileges.

10. The method of claim 1, wherein the opening of the channel for the non-kernel space application comprises requesting a channel schema for the non-kernel space application.

11. A system for active queue management in user space networking stacks, the system comprising:
    one or more processor apparatus;
    physical memory in operative communication with the one or more processor apparatus; and
    a network interface controller in operative communication with the physical memory and the one or more processor apparatus processors;
    wherein the one or more processor apparatus are configured to:
      open a channel for a non-kernel space application, the non-kernel space application comprising a user space networking stack;
      enable a write, by the non-kernel space application, of data to the channel;
      transact the data written to the channel over a network connection via the network interface controller;
      based at least on an indication of network congestion, update a network condition for the network connection via a write to a data structure associated with the physical memory, the data structure configured to cease writing of data to the channel by the non-kernel space application based at least on a notification of the updated network condition to the user space networking stack via the data structure; and
      modify operation of the non-kernel space application, the modification of the operation relating to the writing of the data to the channel, in response to the updated network condition for the network connection.

12. The system of claim 11, wherein the network interface controller further comprises active queue management for legacy applications, the legacy applications comprising kernel-based networking stacks.

13. The system of claim 11, wherein the data structure associated with the physical memory comprises a flow advisory table and the update of the network condition comprises a write to the flow advisory table by a kernel process.

14. The system of claim 13, wherein the one or more processor apparatus are further configured to modify the operation of the non-kernel space application responsive to an eventing methodology.

15. The system of claim 14, wherein the non-kernel space application is configured to selectively access the flow advisory table responsive to the updated network condition.

16. The system of claim 11, wherein the one or more processor apparatus are further configured to:
generate, by the non-kernel space application, a plurality of flows for the opened channel.

17. The system of claim 16, wherein the one or more processor apparatus are further configured to:
prioritize one of the plurality of flows over another one of the plurality of flows.

18. The system of claim 17, wherein to modify the operation of the non-kernel space application, the one or more process apparatus are further configured to discard packets associated with the another one of the plurality of flows without a discard of packets associated with the one of the plurality of flows.

19. The system of claim 11, wherein to open of the channel for the non-kernel space application, the one or more processor apparatus are configured to request a channel schema for the non-kernel space application.

20. A computerized device comprising:
a kernel space networking stack in a kernel space operable on the computerized device, the kernel space comprising a buffer configured for active queue management of data exchanged with a network;
a user space networking stack in a user space operable on the computerized device, the user space networking stack being configured to transmit data to the kernel space networking stack; and
a shared memory structure configured for data communication with the user space networking stack and the kernel space networking stack;
wherein the kernel space networking stack is configured to:
transmit, to the network, data received from the user space networking stack;
based at least on a change in a network condition relating to the transmission to the network, provide data relating to the network condition via at least one notification from the buffer to the shared memory structure; and
based at least on the provision of the data relating to the network condition, cause modification of operation of the user space networking stack, the modification comprising cessation of further transmission of data by the user space networking stack to the kernel space networking stack.

* * * * *